(12) United States Patent
Watanabe et al.

(10) Patent No.: US 7,205,531 B2
(45) Date of Patent: Apr. 17, 2007

(54) SAMPLE INFORMATION MEASURING METHOD AND SCANNING CONFOCAL MICROSCOPE

(75) Inventors: Hideo Watanabe, Tokyo (JP); Wataru Nagata, Tokyo (JP)

(73) Assignee: Olympus Corporation, Tokyo (JP)

( * ) Notice: Subject to any disclaimer, the term of this patent is extended or adjusted under 35 U.S.C. 154(b) by 157 days.

(21) Appl. No.: 10/991,123

(22) Filed: Nov. 17, 2004

(65) Prior Publication Data

US 2005/0161592 A1    Jul. 28, 2005

(30) Foreign Application Priority Data

Nov. 21, 2003  (JP) .............................. 2003-391642
Nov. 12, 2004  (JP) .............................. 2004-328368

(51) Int. Cl.
*H01J 3/14*   (2006.01)
*G02B 21/00*  (2006.01)

(52) U.S. Cl. ................... 250/234; 250/201.3; 250/548; 359/383; 356/609

(58) Field of Classification Search ............. 250/201.3, 250/559.22, 234, 221, 548; 359/368, 383; 356/609

See application file for complete search history.

(56) References Cited

U.S. PATENT DOCUMENTS 5,841,894 A * 11/1998 Horie .......................... 382/154

FOREIGN PATENT DOCUMENTS

| JP | 9-68413 | 3/1997 |
| JP | 9-113235 | 5/1997 |
| JP | 11-264933 | 9/1999 |

* cited by examiner

*Primary Examiner*—Kevin Pyo
(74) *Attorney, Agent, or Firm*—Scully, Scott, Murphy & Presser PC

(57) ABSTRACT

When irradiating a sample with light from a light source through an object lens, discretely changing a relative position between a beam condensing position of the object lens and the sample in an optical axis direction of the converging beam, obtaining light intensity information from the sample at each relative position, extracting plural pieces of light intensity information from a light intensity information group, estimating a maximum value on a change curve adaptive to the plural pieces of extracted light intensity information and the relative position for the maximum value, and obtaining the estimated maximum value of the light intensity information and relative position as brightness information and height information, these information about the sample can be continuously obtained by discretely performing an iterative operation on the relative position between a beam condensing position of the object lens and the sample in an optical axis direction of the converging beam.

28 Claims, 31 Drawing Sheets

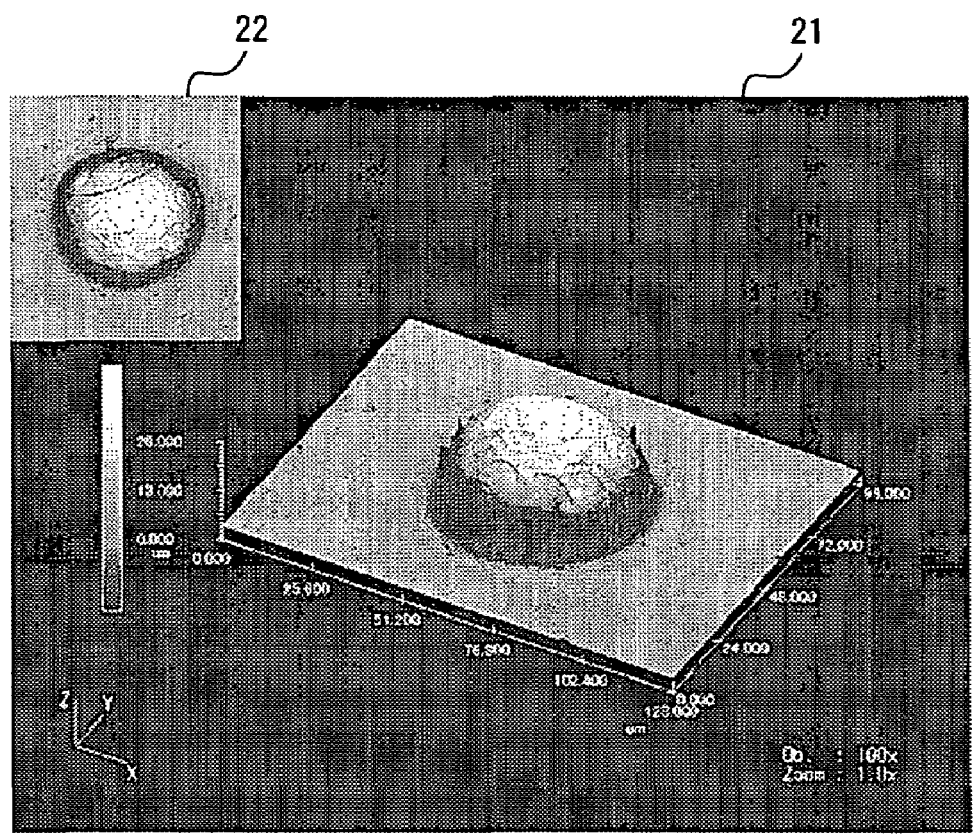
F I G. 13

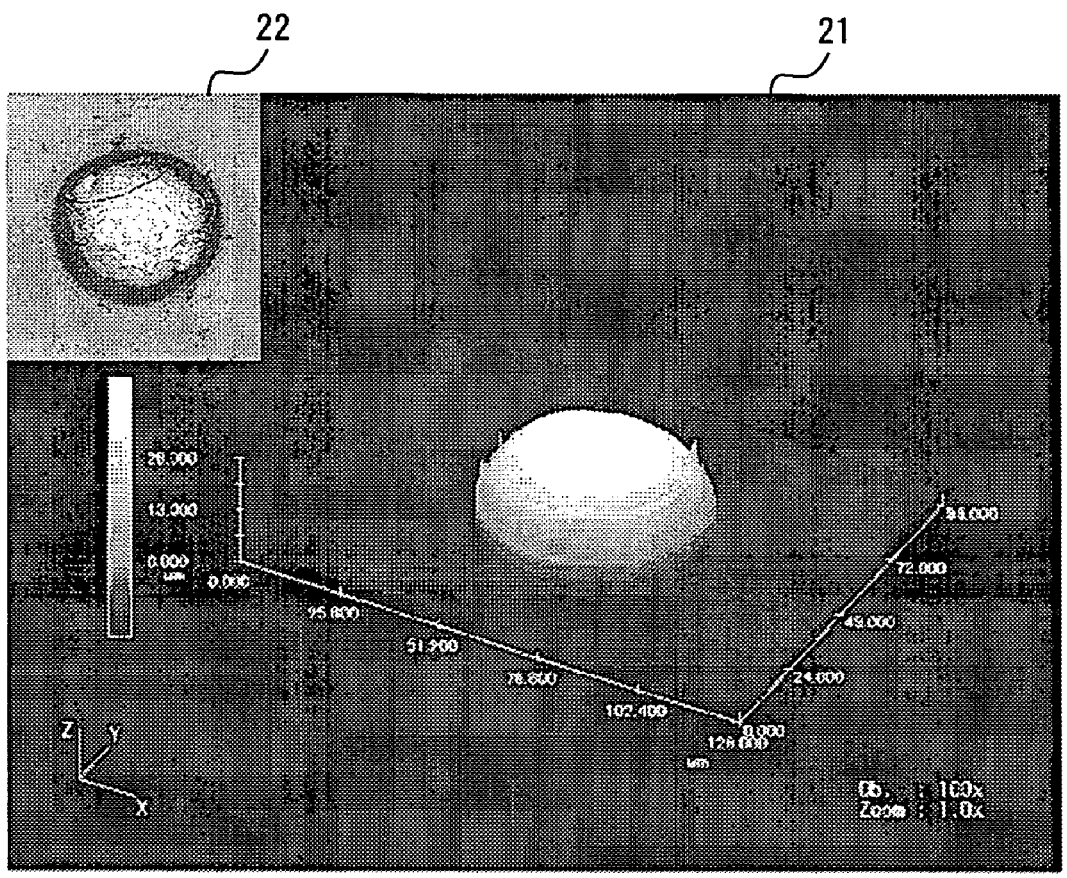
F I G. 14

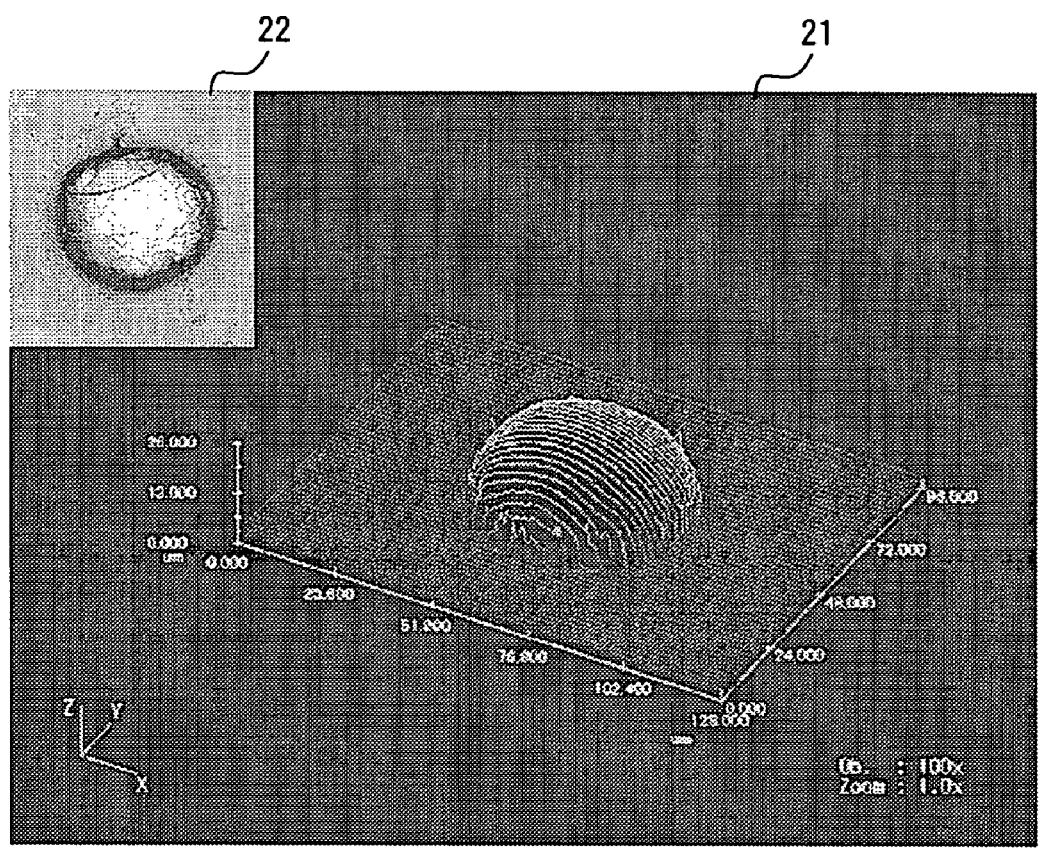
F I G. 15

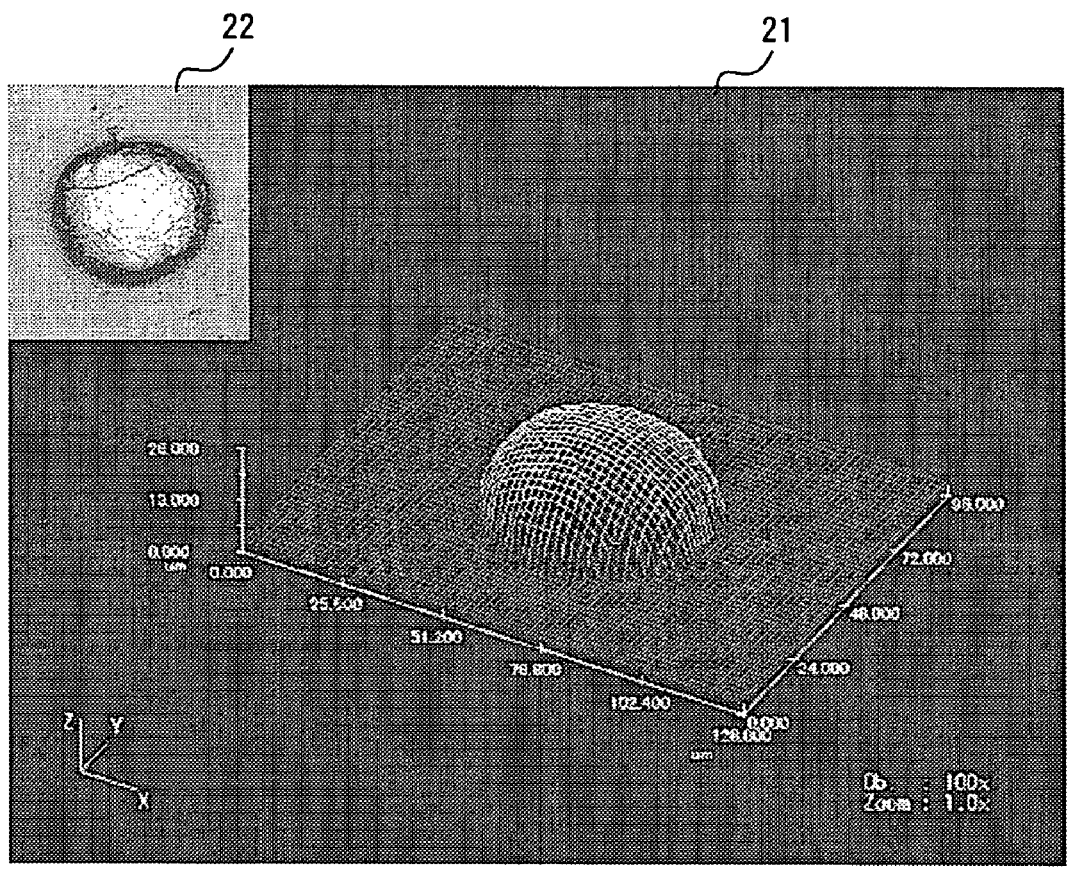
F I G. 16

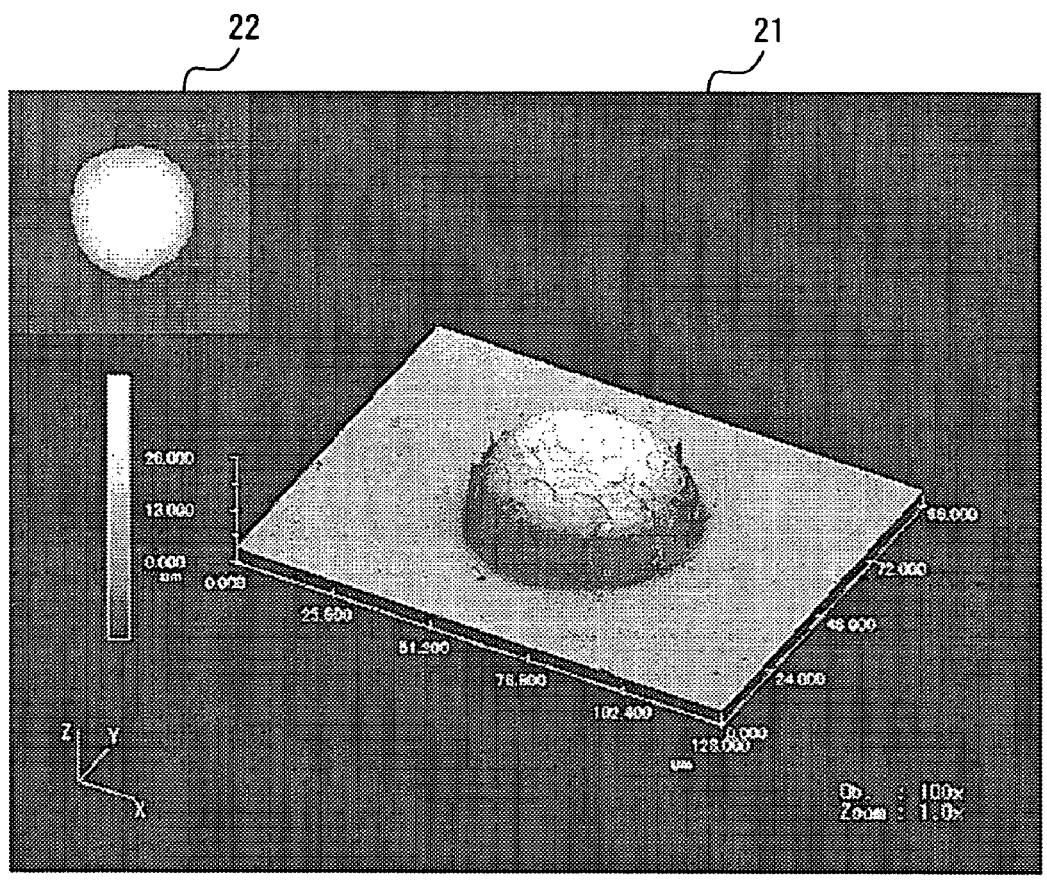
F I G. 17

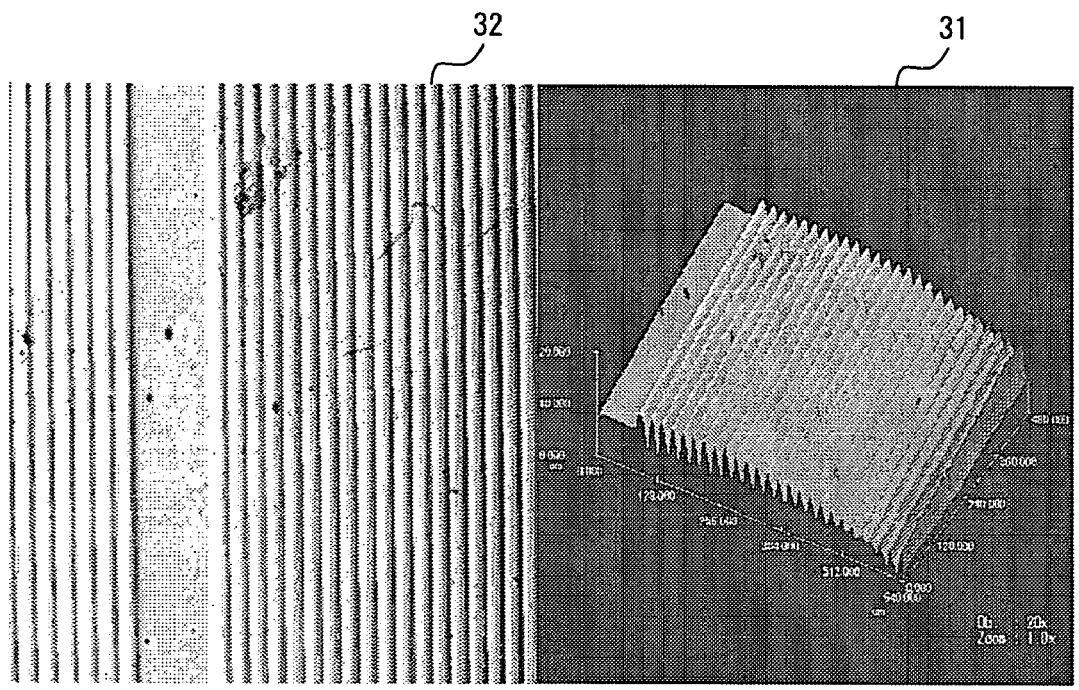
F I G. 2 1

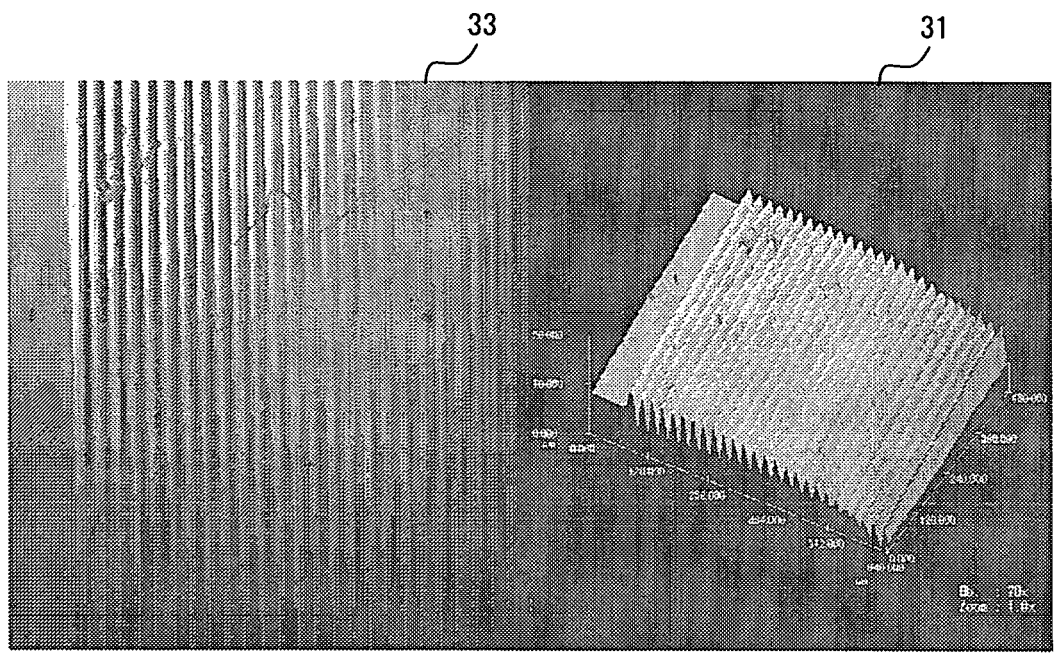
F I G. 2 5

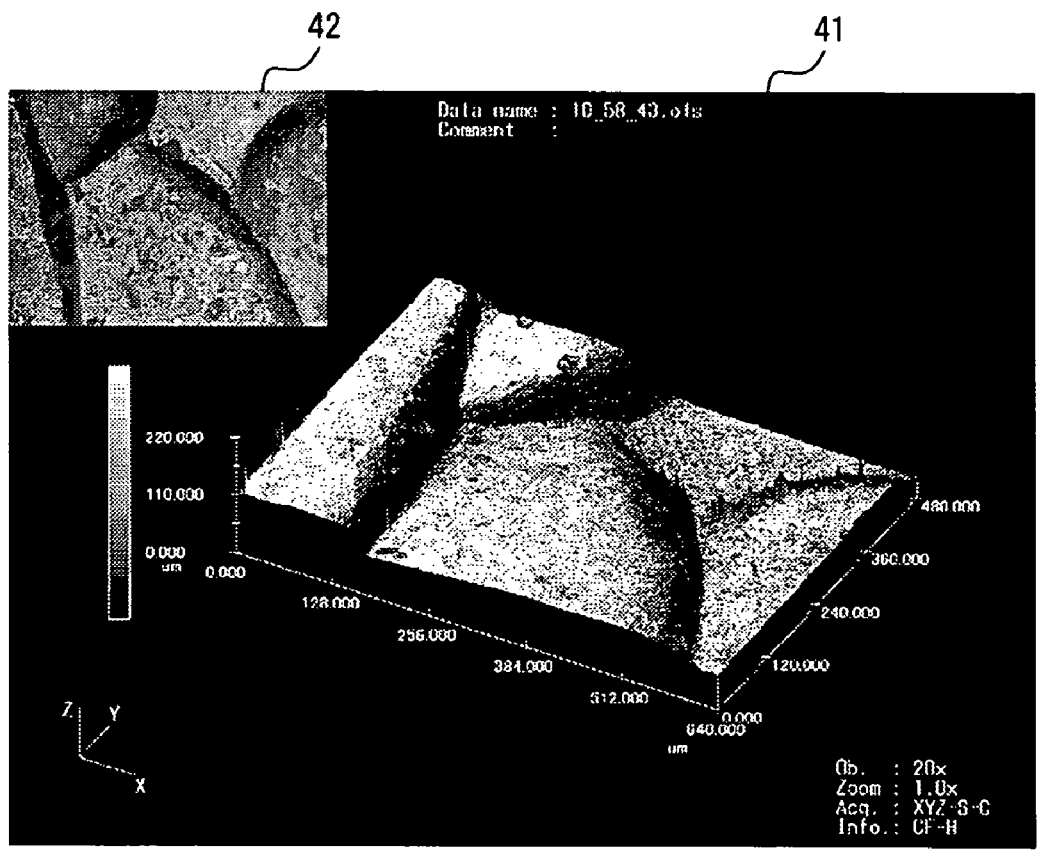
F I G. 27

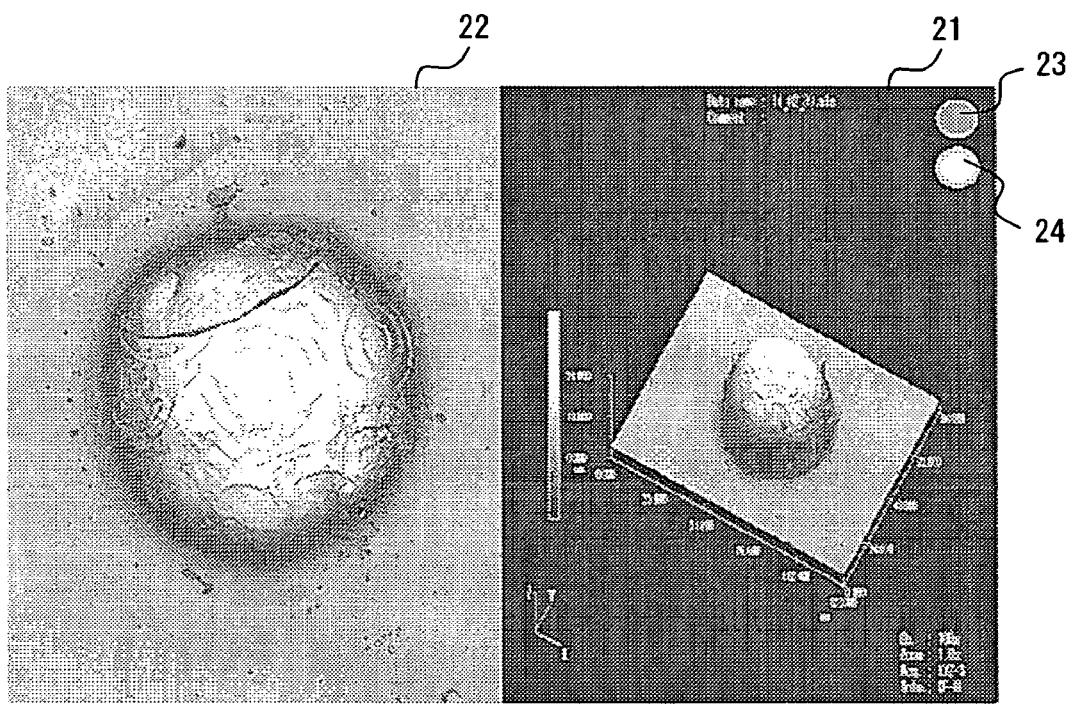
F I G. 29

SAMPLE INFORMATION MEASURING METHOD AND SCANNING CONFOCAL MICROSCOPE

CROSS REFERENCE TO RELATED APPLICATIONS

This application claims benefit of Japanese Applications No. 2003-391642, filed Nov. 21, 2003; and No. 2004-328368, files Nov. 12, 2004, the contents of which are incorporated by this reference.

BACKGROUND OF THE INVENTION

1. Field of the Invention

The present invention relates to a sample information measuring method and a scanning confocal microscope, and more specifically to a sample information measuring method and a scanning confocal microscope for measuring surface information about a height direction of a sample using the scanning confocal microscope, and displaying a three-dimensional shape of the sample in a visually recognizable manner.

2. Description of the Related Art

Conventionally, a scanning confocal microscope applies dotted illumination to a specimen, converges transmitted light, reflected light, or fluorescence from the specimen on a confocal diaphragm, and detects by a photodetector the intensity of the light passing through the confocal diaphragm, thereby obtaining the surface information about the specimen. A scanning confocal microscope scans the surface of the specimen using dotted illumination in various methods, thereby obtain the surface information about the specimen in a wide range.

FIG. 1A shows the outline of the configuration of a conventional scanning confocal microscope.

With the scanning confocal microscope shown in FIG. 1A, a beam output from a light source 1 passes through a beam splitter 2, and enters a two-dimensional scanning mechanism 3. The two-dimensional scanning mechanism 3 has a first optical scanner 3a and a second optical scanner 3b, performs two-dimensional scanning using luminous flux, and leads it to an object lens 7. The luminous flux input to the object lens 7 becomes converging beam and scans the surface of a sample 8.

The light reflected by the surface of the sample 8 is introduced from the object lens 7 again to the beam splitter 2 through the two-dimensional scanning mechanism 3, then reflected by the beam splitter 2, and converges on a pinhole 10 by an image forming lens 9. The pinhole 10 cuts off the reflected light from the points other than the beam condensing point of the sample 8 and a photodetector 11 detects the light only passing through the pinhole 10.

The specimen 8 is held on a sample table 13. A stage 14 and the photodetector 11 are controlled by a computer 12.

The beam condensing position by the object lens 7 is in a position optically conjugate with the pinhole 10. When the sample 8 is in the beam condensing position of the object lens 7, the reflected light from the sample 8 converges on the pinhole 10 and passes through the pinhole 10. When the sample 8 is displaced from the beam condensing position of the object lens 7, the reflected light from the sample 8 does not converges on the pinhole 10, and does not pass through the pinhole 10.

FIG. 1B shows the relationship between the relative position (Z) of the object lens 7 to the specimen 8 and the output (I) of the photodetector 11.

This relation is called I-Z curve as follows.

As shown in FIG. 1B, when the sample 8 is in the beam condensing position $Z_0$ of the object lens 7, the output of the photodetector 11 indicates a maximum value. As the relative position of the object lens 7 to the sample 8 leaves from the position, the output of the photodetector 11 indicates a sudden decrease.

With the characteristic, if the two-dimensional scanning mechanism 3 performs two-dimensional scanning on the beam condensing point, and an image is generated by the output of the photodetector 11 in synchronization with the two-dimensional scanning mechanism 3, then an image of only a specific height portion of the sample 8 is formed, and an image (confocal image) is obtained by optically slicing the sample 8. Furthermore, the sample 8 is discretely moved on the stage 14 in the optical axis direction, the two-dimensional scanning mechanism 3 performs scanning in each position to obtain a confocal image, and the position Z of the stage 14 where the output of the photodetector 11 indicates the maximum value is detected, thereby obtaining the height information about the specimen 8. Additionally, by overlaying and displaying the maximum value of the output of the photodetector 11 at each point of the sample, an image can be obtained with all points of the image displayed in focus (extend image).

When the height of the sample 8 is measured with the above-mentioned configuration, it is necessary to reduce the amount of each travel of the stage 14 to enhance the measurement precision. As a result, it takes some time to make a necessary measurement. Therefore, a height measuring method is proposed to enhance the precision in measuring the height of the sample 8 without reducing each the amount of each travel of the stage 14 (refer to Japanese Patent Laid-open Publication No. Hei 9-68413).

In this method, the output of the photodetector 11 is sequentially obtained while moving the stage 14 based on a predetermined amount of travel. Then, based on the output of the photodetector 11 relating to the three points, that is, the point indicating the maximum value of the output and the points before and after the point indicating the maximum value, an I-Z curve is approximated by a quadratic curve, and the position of the stage 14 where the output of the photodetector 11 is to be the maximum is obtained with the precision equal to or lower than the amount of travel of the stage 14, thereby obtaining the height information.

There is a disclosed technology of obtaining the surface height data H(x,y) as the surface information about the sample corresponding to each pixel based on a confocal image captured at each height in the height direction of the sample with a view to measuring the shape of the surface of the sample with high resolution without reducing the relative amount of travel of the sample in the height direction (refer to Japanese Patent Laid-open Publication No. Hei 9-113235).

Practically, the first height position D(m) where the quantity of light rises to the maximum value in the height direction is obtained, and the first light quantity Fm(x,y) in the first height position D(m) and the second light quantity Fm−1(x,y) and the third light quantity Fm+1(x,y) respectively at the second height position D(m−1) and the third height position D(m+1) respectively close to the upper and lower sides of the first height position D(m) are obtained. Based on these values, a quadratic curve indicating a change of the quantity of light relative to the height position is obtained, and the extreme value of the quality of light is obtained from the quadratic curve. Furthermore, the height position Dmax corresponding to the extreme value is defined as surface height data H(x,y).

Additionally, a scanning confocal microscope capable of obtaining the optical axis direction position and the three-dimensional shape of a sample without scanning in the optical axis direction is disclosed. This scanning confocal microscope includes a laser beam source, a confocal scanner for outputting after passing output light of the laser beam source through an aperture, an optical microscope for converging the output light from the confocal scanner on the sample, a shooting device for shooting the light passing through the aperture of the confocal scanner in the return light from the sample, and obtaining a sectional image, and a control device for obtaining the optical axis direction position of the sample from the quality of light of the sectional image based on the optical axis direction position to light quantity characteristic (Japanese Patent Laid-open Publication No. Hei 11-264933).

SUMMARY OF THE INVENTION

According to an aspect of the present invention, the sample information measuring method according to the present invention is used for a scanning confocal microscope, and includes: irradiating a sample with light from a light source through an object lens; discretely changing a relative position between the beam condensing position of the object lens and the sample along an optical axis direction of the converging beam; obtaining light intensity information from the sample in each relative position; extracting plural pieces of light intensity information from a group of the plural pieces of light intensity information; estimating a maximum value in a change curve matching the plural pieces of extracted light intensity information and the corresponding relative positions; and obtaining a maximum value of the estimated light intensity information and the relative position respectively as brightness information and height information. The method continuously obtains the brightness information and the height information about the sample by discretely and iteratively performing a reciprocal operation in the optical axis direction of the converging beam on the relative position between the beam condensing position of the object lens and the sample.

BRIEF DESCRIPTION OF THE DRAWINGS

The present invention will be more apparent from the following detailed description when the accompanying drawings are referenced.

FIG. 13 shows an example (2) of displaying a 3D image 21 and an extend image 22 on a monitor 15;

FIG. 14 shows an example (3) of displaying a 3D image 21 and an extend image 22 on a monitor 15;

FIG. 15 shows an example (4) of displaying a 3D image 21 and an extend image 22 on a monitor 15;

FIG. 16 shows an example (5) of displaying a 3D image 21 and an extend image 22 on a monitor 15;

FIG. 17 shows an example (6) of displaying a 3D image 21 and an extend image 22 on a monitor 15;

FIG. 21 shows an example (3) of a 3D image 31 and a non-confocal image 32 displayed on the monitor 15;

FIG. 25 shows an example (3) of a 3D image 31 and a non-confocal image 33 displayed on the monitor 15;

FIG. 27 shows an example of displaying a 3D image 41 and a color image 42 on the monitor 15;

FIG. 29 shows an example of displaying a three-dimensional image update display lamp showing an iterative display timing of the 3D image 31.

DESCRIPTION OF THE PREFERRED EMBODIMENTS

The embodiments of the present invention are described below by referring to the attached drawings.

Figure 2A:
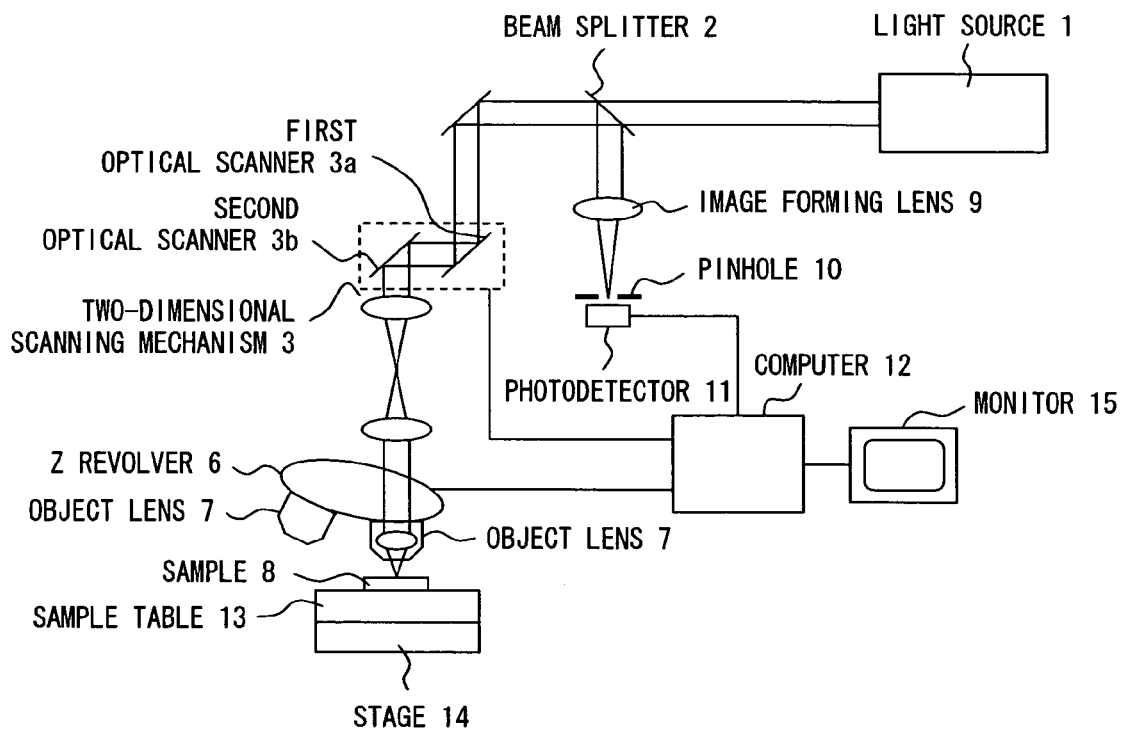
FIG. 2A shows the configuration of the scanning confocal microscope to which the first embodiment of the present invention is applied.

FIG. 2A shows the configuration of the scanning confocal microscope to which the first embodiment of the present invention is applied.

In the scanning confocal microscope shown in FIG. 2A, the light output from the light source 1 passes through the beam splitter 2, and is then input to the two-dimensional scanning mechanism 3. The two-dimensional scanning mechanism 3 comprises the first optical scanner 3a and the second optical scanner 3b, performs scanning using luminous flux in a two-dimensional manner, and leads the luminous flux to the object lens 7. The luminous flux input to the object lens 7 scans the surface of the sample 8 as converging beams.

The light reflected by the surface of the sample 8 is led to the beam splitter 2 through the two-dimensional scanning mechanism 3 from the object lens 7, and then reflected by the beam splitter 2, and converges at the pinhole 10 by the image forming lens 9. The pinhole 10 cuts off the reflected light from the portions other than the beam condensing point of the sample 8, and only the light passing through the pinhole 10 is detected by the photodetector 11.

A Z revolver 6 has a plurality of object lens 7, inserts the object lens 7 of desired power into an optical path of two-dimensional scanning, moves in the Z axis direction, and changes the relative position between the beam condensing position of the object lens 7 and the sample 8.

The sample 8 is placed on the sample table 13, and can be moved in the XY directions by the stage 14. The two-dimensional scanning mechanism 3, Z revolver 6, and photodetector 11, etc. are controlled by a microscope control program stored in the computer 12, and the user can operate each unit on the operation screen displayed on a monitor 15.

The beam condensing position by the object lens 7 is conjugate with the pinhole 10. When the sample 8 is in the beam condensing position by the object lens 7, the reflected light from the sample 8 converges on the pinhole 10, and passes through the pinhole 10. When the sample 8 is displaced from the beam condensing position, the reflected light from the sample 8 does not converge on the pinhole 10, and does not pass through the pinhole 10.

Figure 1A:
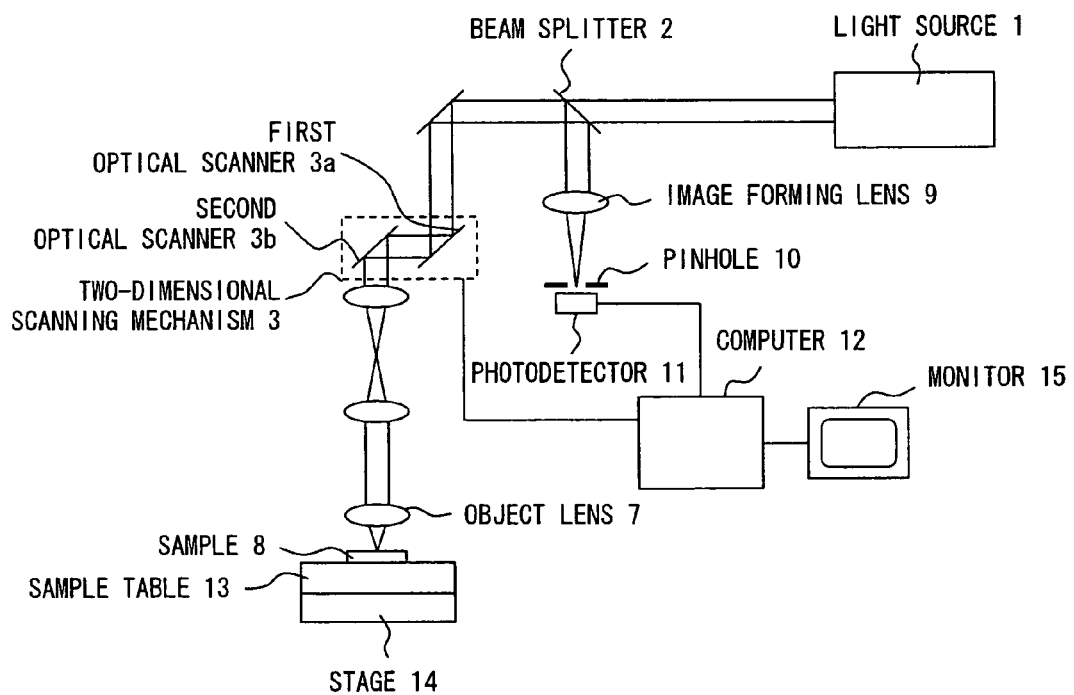
FIG. 1A shows the outline of the configuration of the conventional scanning confocal microscope.
Figure 1B:
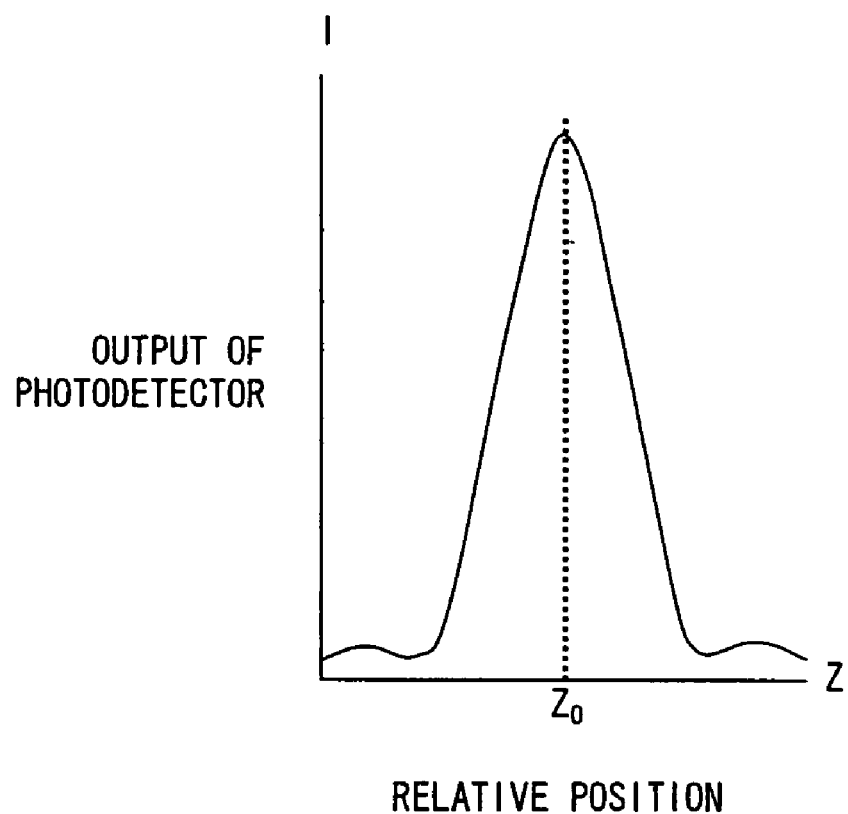
FIG. 1B shows the relationship between the relative position (Z) of the object lens 7 and the sample 8 and the output (I) of the photodetector 11.

According to the I-Z curve indicating the relationship between the relative position (Z) of the object lens 7 shown in FIG. 1B to the sample 8 and the output (I) of the photodetector 11, when the sample 8 is in the beam condensing position $Z_0$ of the object lens 7, the output of the photodetector 11 indicates the maximum value, and as the relative position between the object lens 7 and the sample 8 deviates from the position, the output of the photodetector 11 suddenly drops.

By the above-mentioned characteristic, only the specific height of the specimen 8 is displayed as an image, and an image can be obtained as an optically sliced image (confocal image) of the sample 8 when the two-dimensional scanning is performed on the beam condensing point and the output of the photodetector 11 is displayed as an image in synchronization with the two-dimensional scanning mechanism 3. Then, the image is displayed with the operation screen on the monitor 15.

The sample information measuring method to which the present invention is applied is explained using the scanning confocal microscope shown in FIG. 2A.

Figure 2B:
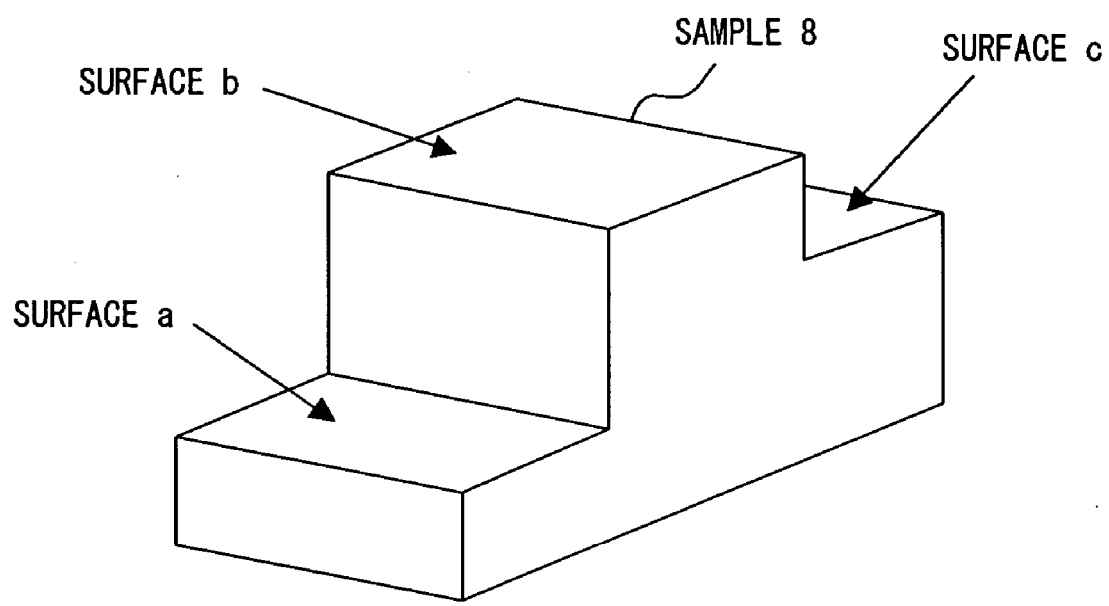
FIG. 2B is an explanatory view of an example of the shape of a sample to be measured.

FIG. 2B is an explanatory view showing an example of the shape of a sample to be measured.

The sample shown in FIG. 2B is assumed as the sample 8 to be measured by the scanning confocal microscope. That is, assume that the sample 8 has three surfaces having different heights (thickness in the Z direction), that is, the surfaces a, b, and c from one end to the other end.

Figure 3:
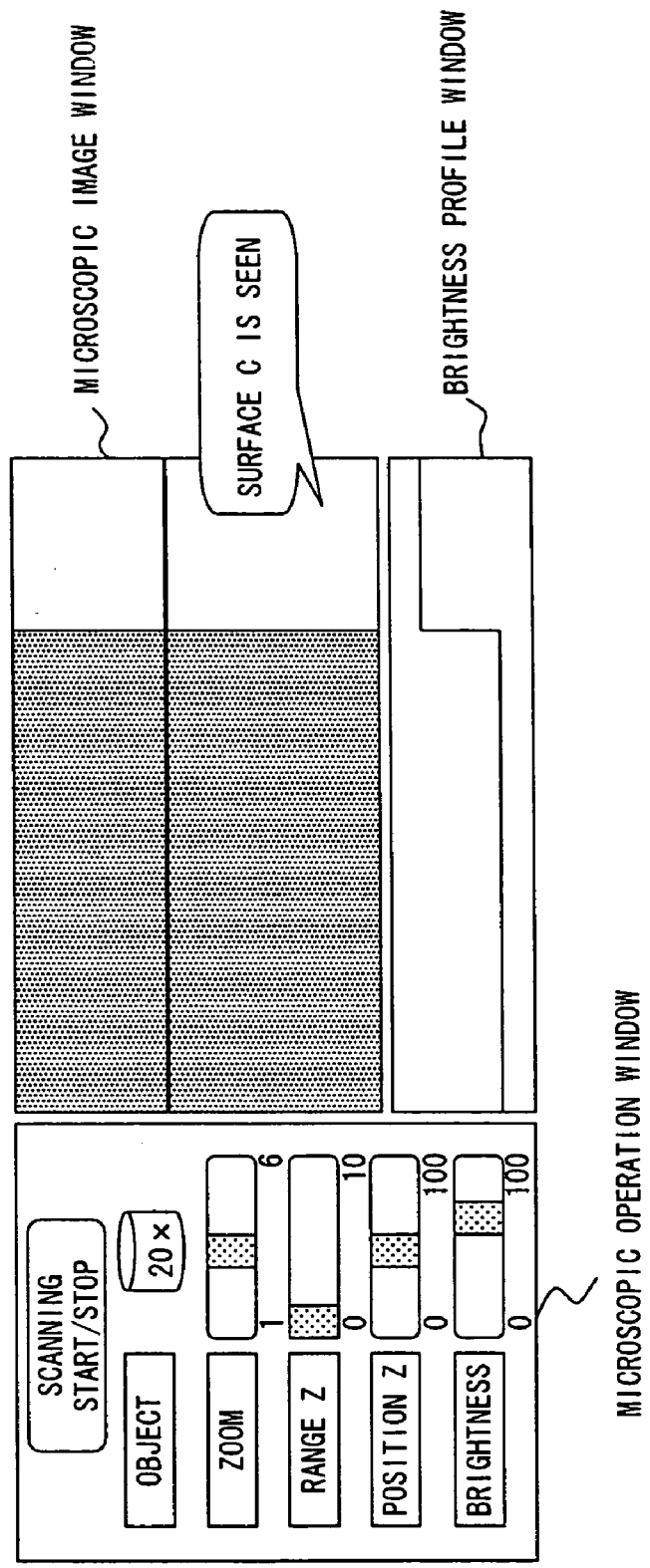
FIG. 3 shows an example of an image display when a focal point is obtained on the plane c.

FIG. 3 shows an example of displaying an image when a focus is obtained on the surface c.

First, the two-dimensional scanning of the scanning confocal microscope is started, and the focus is obtained on the surface c of the sample 8. At this time, the monitor 15 displays the image as shown in FIG. 3. Practically, the scanning confocal microscope starts obtaining an image using a "scanning start/stop" button, the object lens 7 of desired power is selected by a "object" button, and an adjustment is made such that an observed portion can be displayed in a desired size together with the "zoom" scroll bar. Then, the Z revolver 6 is moved up and down using the "position Z" scroll bar, and the focal surface of the object lens 7 is aligned with the surface c of the sample 8.

Figure 4:
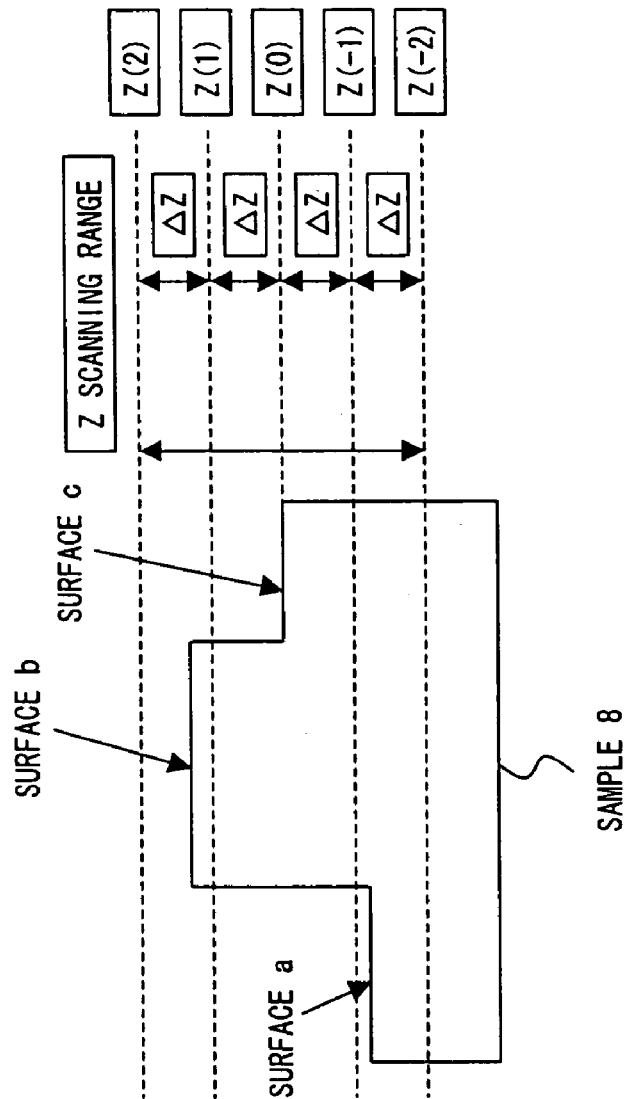
FIG. 4 is an explanatory view of setting a scanning range in the X direction.

FIG. 4 is an explanatory view of setting the scanning range in the Z direction.

After the focal surface is aligned with the surface c of the sample 8, the scanning range in the Z direction is determined. The condition of the scanning range in the Z direction is set with the target of the area indicated by the "Z scanning range" shown in FIG. 4. The conventional scanning confocal microscope estimates and determines the rough shape of the sample 8 and the area of the "Z scanning range" while checking the two-dimensional image by moving the focal position up and down. However, the present invention can set the Z scanning range from the display of the sample 8 directly displayed on the monitor 15 by the operation of the process described below. On the screen, the reference view range in the XY direction is selected using the "object" button, and the reference position in the Z direction is selected using the "position Z" scroll bar. Then, the three-dimensional scanning range is set using the "zoom" and "Z range" scroll bars.

The computer 12 stores the brightness and height arithmetic program. By executing the brightness and height arithmetic program, the brightness and height information using a confocal image can be obtained.

Described below is the brightness and height measuring process.

When the Z range scroll bar is set to a value other than zero (0), the Z revolver 6 starts moving stepwise up and down in the Z scanning range corresponding to the set value using the scroll bar with the current focal position (surface c) set in the center as shown in FIG. 4. While checking the image of the sample 8 displayed on the monitor 15, the user sets a desired Z scanning range on the operation screen. The Z revolver 6 moves at a predetermined travel pitch $\Delta Z$ in the set Z scanning range, and a confocal image is obtained for each Z relative position. For simple explanation, it is assumed that the number of obtained confocal images is 5, that is, the frequency of the travel of the Z revolver 6 is 4 to the positions $Z(-2)$, $Z(-1)$, $Z(0)$, $Z(1)$, and $Z(2)$. The light intensity information about the arbitrary point (for example, the points on the surfaces a, b, and c) of the sample 8 at this time is obtained.

Figure 5:
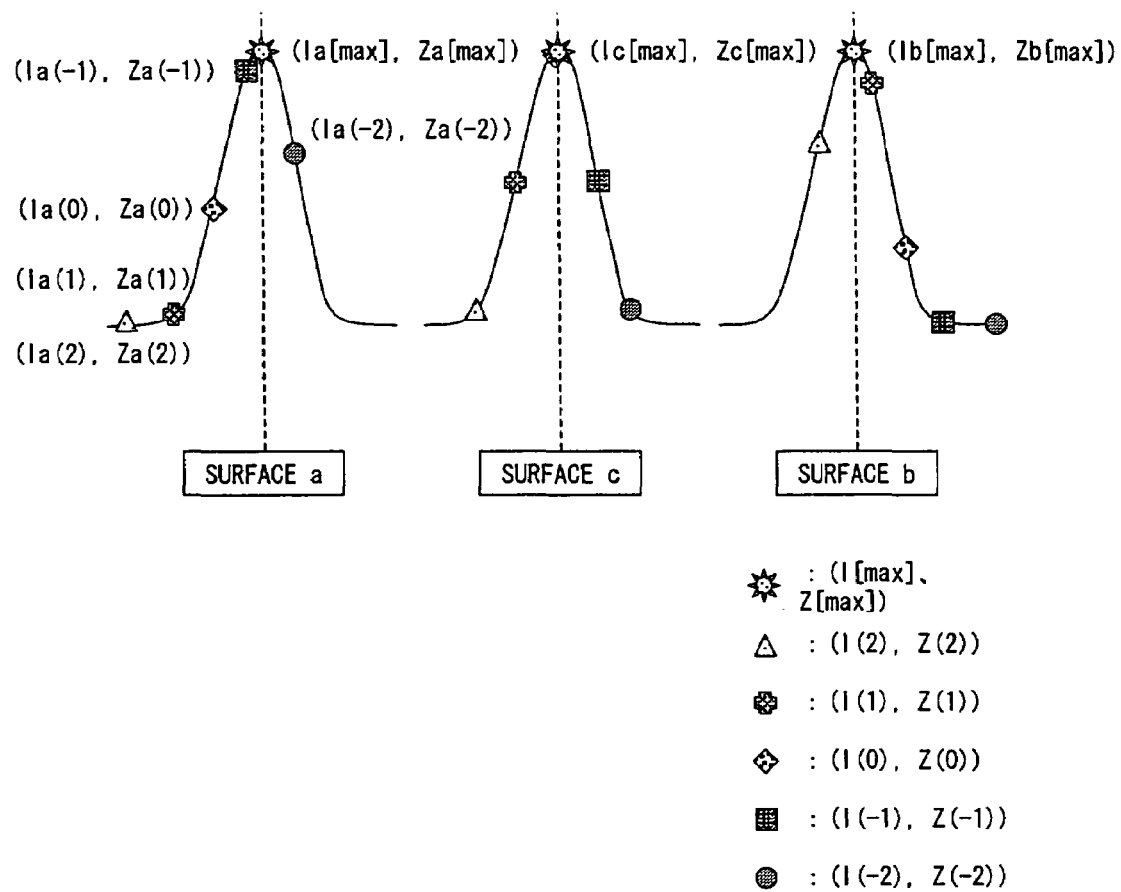
FIG. 5 shows an I-Z curve of an optical intensity group of the points on the planes a, b, and c.
Figure 6:
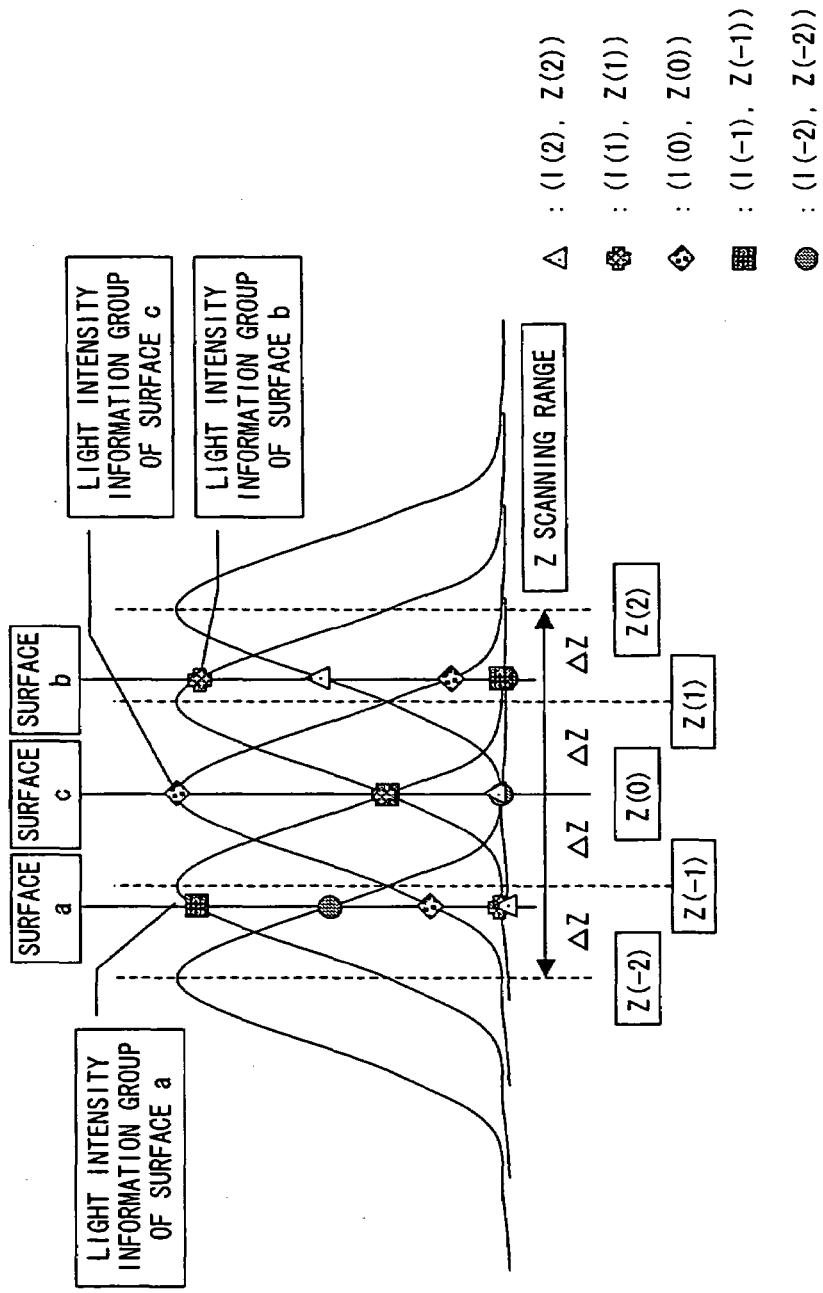
FIG. 6 shows an optical intensity group in the positions of Z(−2) through Z(2)

FIG. 5 shows an I-Z curve of a light intensity point group on the surfaces a, b, and c. FIG. 6 shows the light intensity point group in the positions of the $Z(-2)$ through $Z(2)$.

The light intensity points group on the surfaces a, b, and c indicate the values on the I-Z curve as each point shown in FIG. 5.

Then, the light intensity information on each point is compared with each other, and $(I(n), Z(n))$ indicating the maximum intensity, and the values before and after the maximum intensity point $(I(n-1), Z(n-1))$, $(I(n+1), Z(n+1))$ are extracted. Relating to the surface a in the case shown in FIG. 4, the maximum intensity point is $(Ia(-1), Za(-1))$, and the values before and after the point are $(Ia(0), Za(0))$, $(Ia(-2), Za(-2))$. By assuming the approximate quadratic curve passing through the three points, and obtaining the extreme values, the true maximum value $Ia[max]$ and the position $Za[max]$ of the Z revolver 6 for the maximum value can be obtained. Therefore, the brightness and relative height of the surface of the sample 8 can be obtained with the resolution of the travel pitch $\Delta Z$ or higher. The same holds true with the surfaces b and c. The maximum intensity point on the surface b is (Ib(1), Zb(1)), and the points before and after the maximum intensity point are (Ib(0), Zb(0)), (Ib(2), Zb(2)). Therefore, the values Ib [max] and Zb[max] are obtained. The maximum intensity point for the surface c is (Ic(0), Zc(0)), and the points before and after are (Ic(−1), Zc(−1)), (Ic(1), Zc(1)), thereby obtaining the values Ic[max] and Zc[max].

Figure 7:
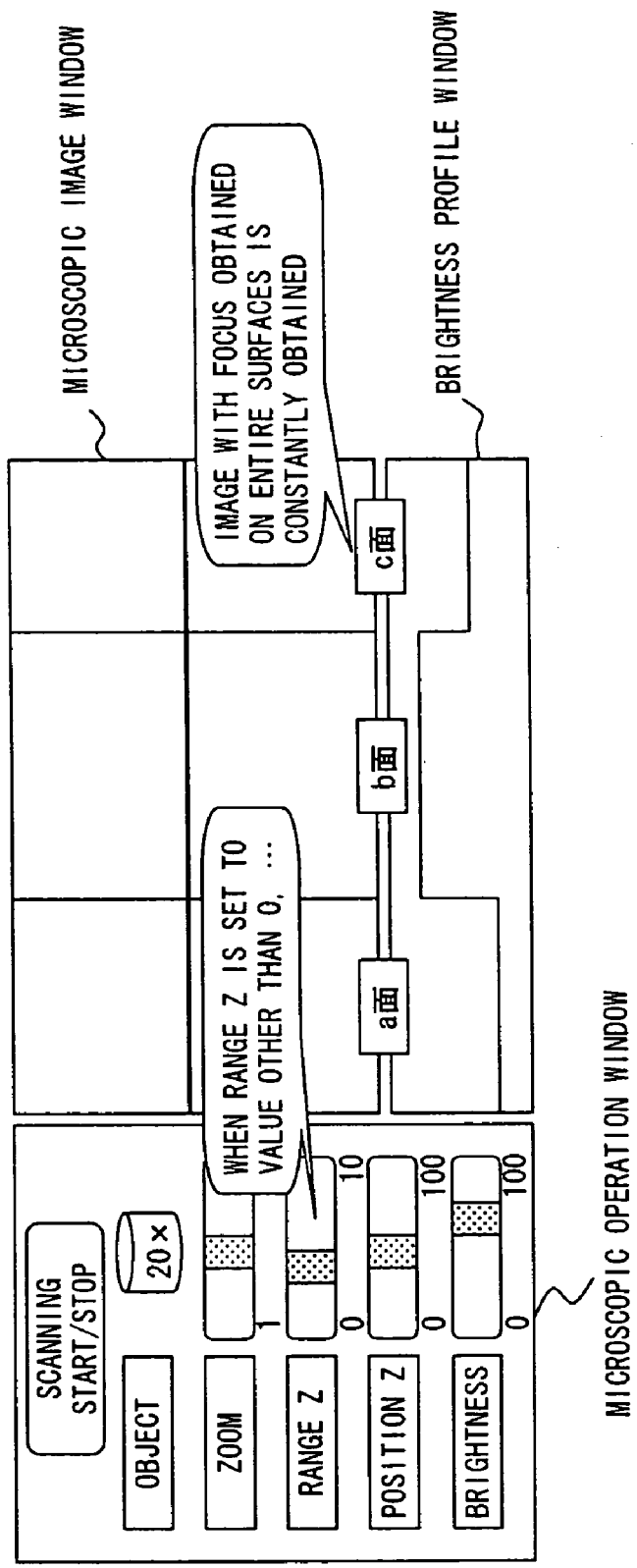
FIG. 7 shows an example of an image display when a focal point is obtained on the entire plane.

FIG. 7 shows an example of displaying an image when a focus is obtained on the entire image.

Since brightness and height information can be extracted by five confocal images, the stepwise travel of the Z revolver 6 is repeated in the order of Z(−2)→Z(−1)→Z(0)→Z(1)→Z(2)→Z(1)→Z(0)→Z(−1)→Z(−2)→ . . . so that the structure of the sample 8 from the surface a to the surface b can be obtained. At this time, if the position in the height direction or the width displayed in the microscopic image window is not appropriate, then the settings can be optimally adjusted while checking the extend image by changing the center of the Z scanning range, that is, the "position Z", or the "range Z" itself respectively. This means if the image for which the focus is entirely obtained is displayed in the microscopic image window, then it is determined that the scanning is being operated in a sufficient area in the height direction of the sample 8.

On the other hand, about 1.8 second is required to obtain five images because about 200 ms is required to obtain one confocal image and about 200 ms is required for each stepwise travel of the Z revolver 6 by assuming that the image size is 1024×768, and the Z scanning range is 5 μm ($\Delta Z=1$ μm). With the additional two seconds as processing time, a total of two seconds are enough to update the brightness and height information.

However, since images are continuously obtained by moving the Z revolver 6 up and down, the fifth image can be used as the first confocal image in the next process of obtaining the brightness and height information. Therefore, one updating operation can be completed within two seconds. This is a sufficiently practical updating speed. Since various combinations are made by the number of lines of one confocal image, the amount of stepwise travel of the Z revolver 6, and the number of steps (range) for an update speed, a user can optionally select a desired combination from among predetermined combinations. For example, when an updating operation is to be quickly performed, the number of lines of a confocal image is to be limited, and the Z scanning range is to be narrowed to a minimal level. In this embodiment, the number of images is five, but three images can be used in obtaining the maximum value in principle from the plural pieces of light intensity information, thereby further raising the updating speed.

Described below is the second embodiment of the present invention.

The configuration of the scanning confocal microscope according to the second embodiment is the same as the configuration of the embodiment explained above by referring to FIG. 2A. However, the information about the sample 8 displayed on the monitor 15 is represented in a three-dimensional array.

Figure 8:
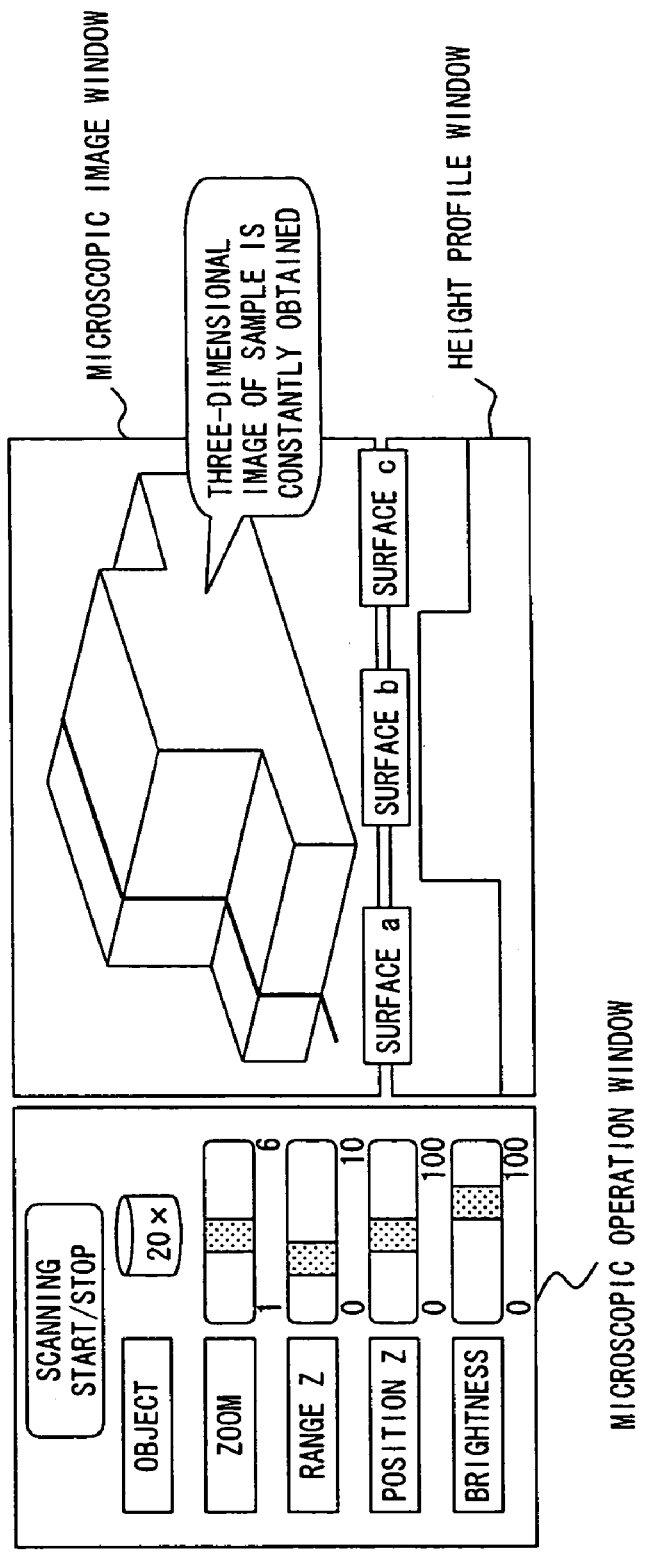
FIG. 8 shows an example of a display according to the second embodiment of the present invention.

FIG. 8 shows an example of a display according to the second embodiment of the present invention.

The display example shown in FIG. 8 refers to simultaneously displaying combined brightness information about the surfaces of the sample 8 on the surface portion of the height information obtained by the brightness and height arithmetic program. Since it is constantly updated in synchronization with the laser scanning of the scanning confocal microscope, it is a true representation in a three-dimensional array of the actual sample 8 in comparison with the two-dimensional display by an extend image. With this display, the user can obtain at a glance the detailed three-dimensional information about the sample 8. The function of rotation, enlargement, reduction, etc. provided for general 3D display software can be arbitrarily performed, and the user can observe an object at a desired angle.

Described below is the third embodiment of the present invention.

As described above, since three-dimensional information about the sample 8 is continuously obtained and updated, it is also possible to continuously measuring any optional unit.

Figure 9:
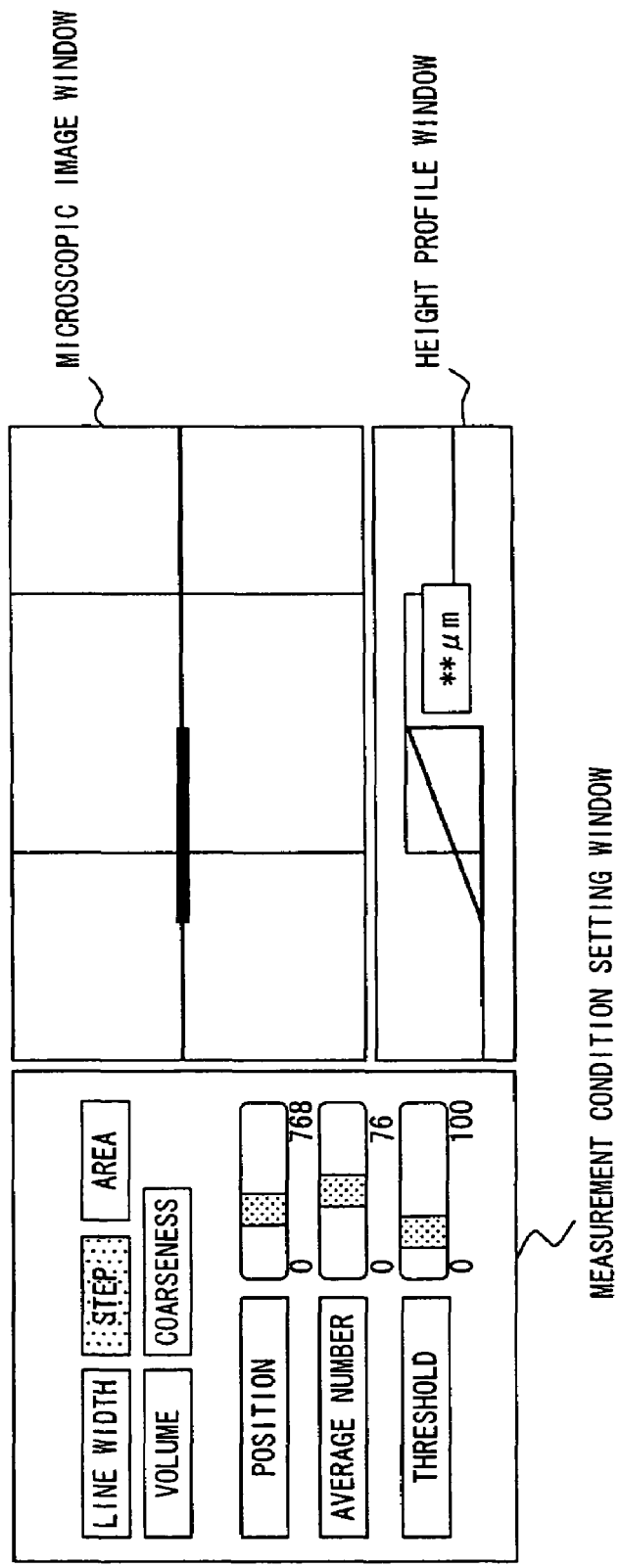
FIG. 9 shows an example of a display of the distance between two indicated points.

FIG. 9 shows an example of displaying the distance between two indicated points.

It is also possible to carry out a measurement directly using a 3D display. Measurement results can be continuously obtained with the update of an image by specifying the measurement position using a line cursor from the sample 8 displayed in the three-dimensional array, and specifying two points in a profile window.

There is, for example, a mouse, etc. connected to the computer 12.

Figure 10:
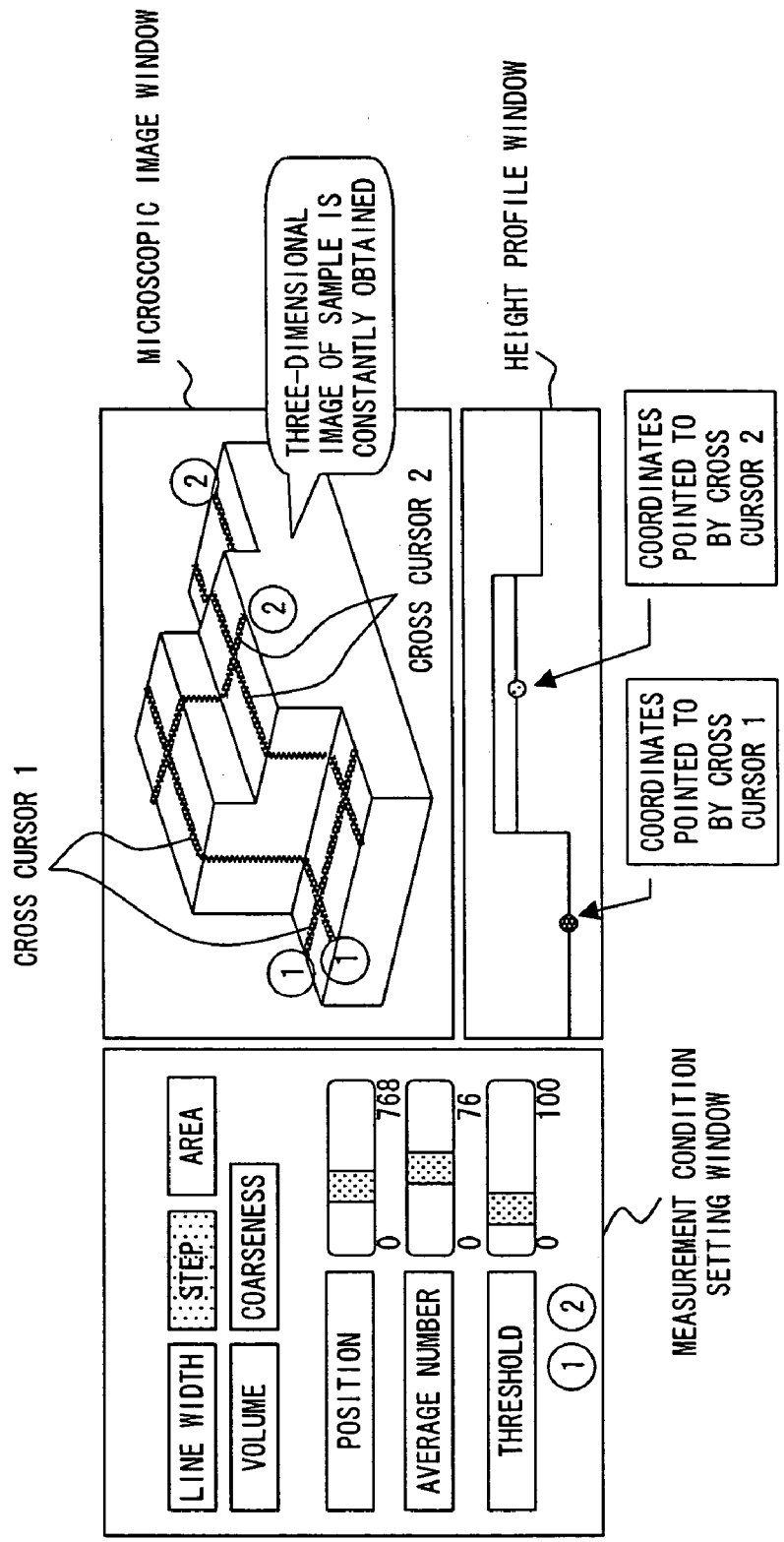
FIG. 10 shows an image of an example indicating two arbitrary points.

For example, as shown in FIG. 10, the "step" in the measurement items is selected, and the line cursor is moved on the target point of the extend image (cross cursor 1 and cross cursor 2). Since the sectional profile is obtained on the line, two points are specified in the profile. Then, the steps between the points are continuously measured, and the display of the measured value is updated in synchronization with the drawing. While the conventional scanning confocal microscope fetches a three-dimensional image for a measurement, the flow of the operations terminates and the process is performed again from the beginning on another condition, the function according to the present invention can continuously perform the processes of "setting a condition"→"checking by measurement"→"amending the condition".

Figure 11:
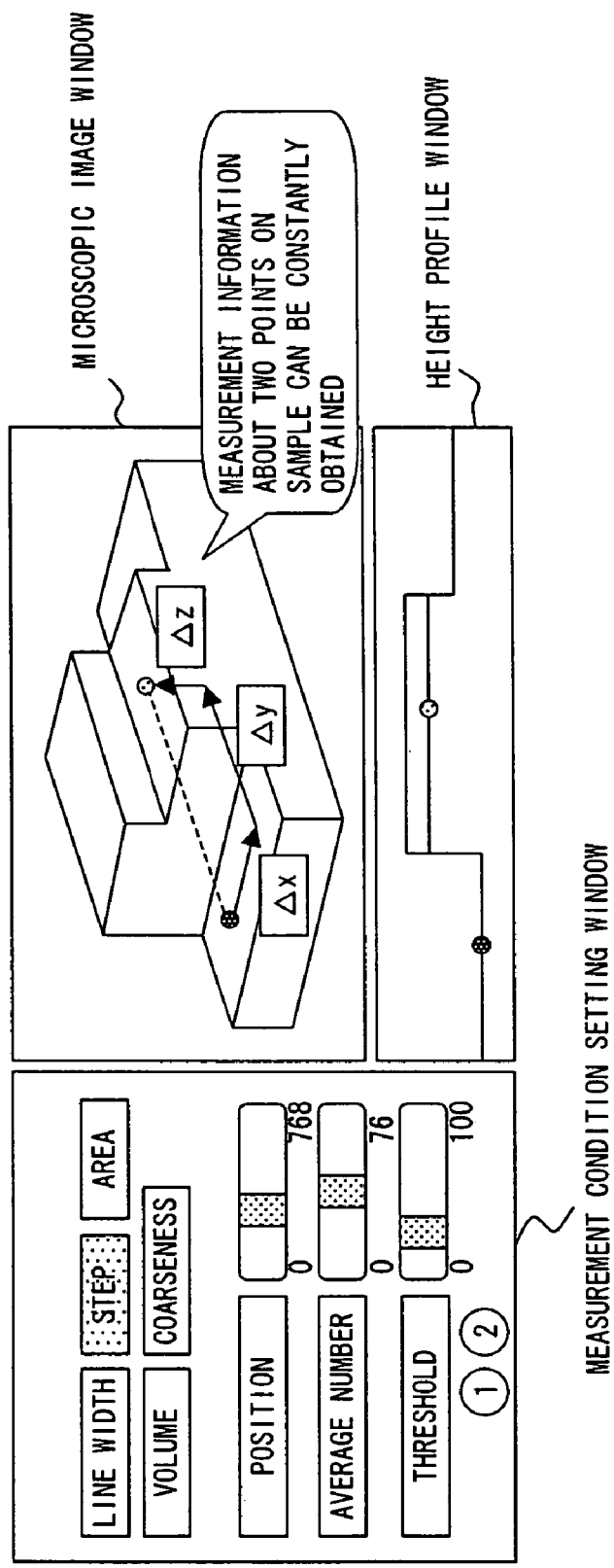
FIG. 11 shows examples of displays of ΔX, ΔY, and ΔZ between the two indicated points.

FIG. 11 shows an example of displaying $\Delta X$, $\Delta Y$, and $\Delta Z$ between two points.

Since it is hard to specify one point in the space on the sample 8 displayed in the three-dimensional array using a mouse, an arbitrary one point can be specified by displaying a cross cursor displayed in the profile on a three-dimensional image. This can be a profile measurement in one line, or the specification can be made among a plurality of different profiles. A measurement result refers to $\Delta X$, $\Delta Y$, and $\Delta Z$ between two specified points, the distance between two points, etc. continuously measured in synchronization with the scanning, and the display is also updated.

Described below is the fourth embodiment of the present invention.

The scanning confocal microscope to which the fourth embodiment of the present invention is applied is the same as the scanning confocal microscope to which the above-mentioned first through third embodiments are applied.

That is, the scanning confocal microscope to which the fourth embodiment of the present invention is applied generates an extend image indicating a focus obtained on the entire image and a height map image. The height map image can be processed by the computer 12 and displayed on the monitor 15 in a three-dimensional array.

The scanning confocal microscope to which the fourth embodiment of the present invention is applied displays an extend image together with the 3D image on the same screen while continuously performing update.

FIGS. 12 through 17 show an example of displaying the 3D image 21 and the extend image 22 displayed on the monitor 15. The 3D image 21 indicating the three-dimensional shape of the surface of the sample 8 and the extend image 22 having the focus obtained on the entire image are displayed on the monitor 15 and simultaneously and continuously updated.

Figure 12:
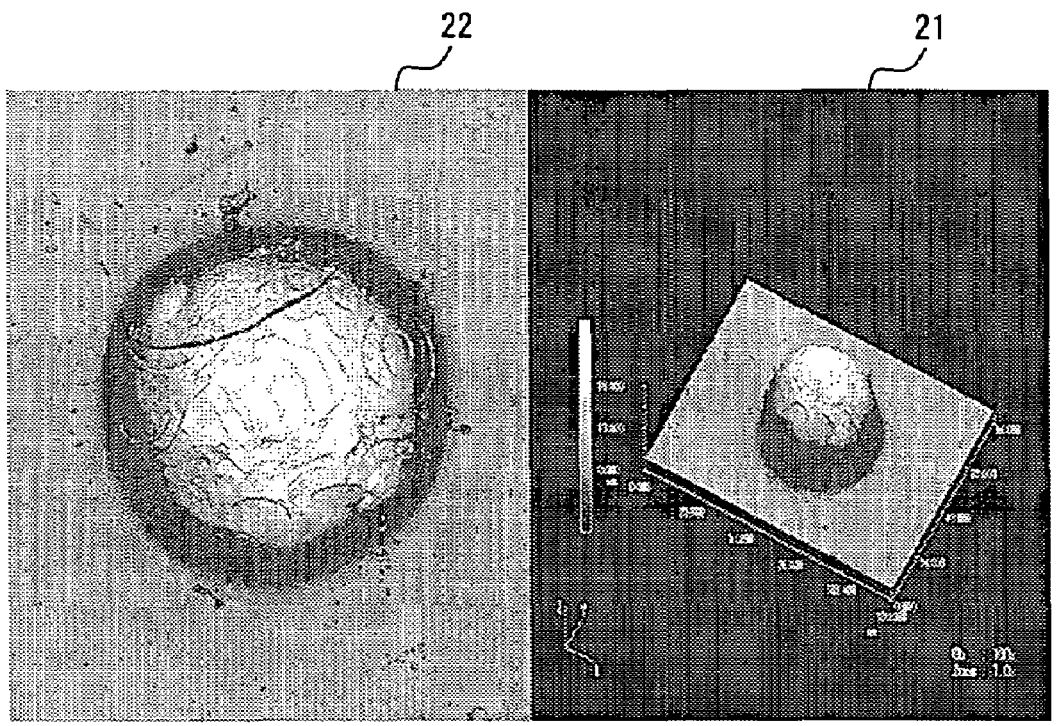
FIG. 12 shows an example (1) of displaying a 3D image 21 and an extend image 22 on a monitor 15.

FIG. 12 shows an example of displaying the three-dimensional image 21 and the two-dimensional extend image 22 in the same screen size. FIG. 13 shows an example of reducing the two-dimensional extend image 22 on a part of the three-dimensional image 21 displayed on the full screen. It is more preferable if ratio of the display size can be arbitrarily changed so that the user can easily see the display.

FIGS. 14 through 16 show an example of reducing the two-dimensional extend image 22 on a part of the three-dimensional image 21 displayed on the full screen. FIG. 14 shows an example of representing the height information in gray scales as the three-dimensional image 21 displayed on the full screen. FIG. 15 shows an example of displaying the height information as the three-dimensional image 21 displayed on the full screen using lines. FIG. 16 shows an example of displaying the height information as a three-dimensional image 21 displayed on the full screen using a mesh.

A displayed two-dimensional image can be the extend image 22 treated in predetermined image processing. For example, if an edge extraction filter is applied to the extend image 22 and the resultant image is displayed, a three-dimensional shape can be observed using the 3D image 21, and the edge portion can be simultaneously observed using the extend image 22. As image processing, for example, general image processing methods such as binarizing filtering, boundary line extraction filtering, etc. can be applied. The image processing can also be performed during display in a continuously updating process.

Additionally, the extend image 22 displayed as a two-dimensional image can be represented as a height map image as shown in FIG. 17, or a contour line image based on the height map image. Thus, the three-dimensional image 21 and the extend image 22 indicating the two-dimensional height information are simultaneously displayed, and continuously updated with a lapse of time, thereby allowing the user to easily recognize the information in the height direction.

The 3D image 21 can arbitrarily rotate, enlarge, or reduce an image during operation, and the Z scanning range set as the current lower limit of the focal position can be moved up and down. Thus, the first Z scanning range can be easily specified for the sample 8 whose amount of step is predetermined based on the designed value, etc.

Thus, by continuously updating and displaying the 3D image 21 and the extend image 22 of the sample 8 on the same screen of the monitor 15, the user can simultaneously observe the three-dimensional information and the two-dimensional information about the sample 8. Therefore, the user can visually observe the surface status of the sample 8 easily.

Described below is the fifth embodiment of the present invention.

Figure 18:
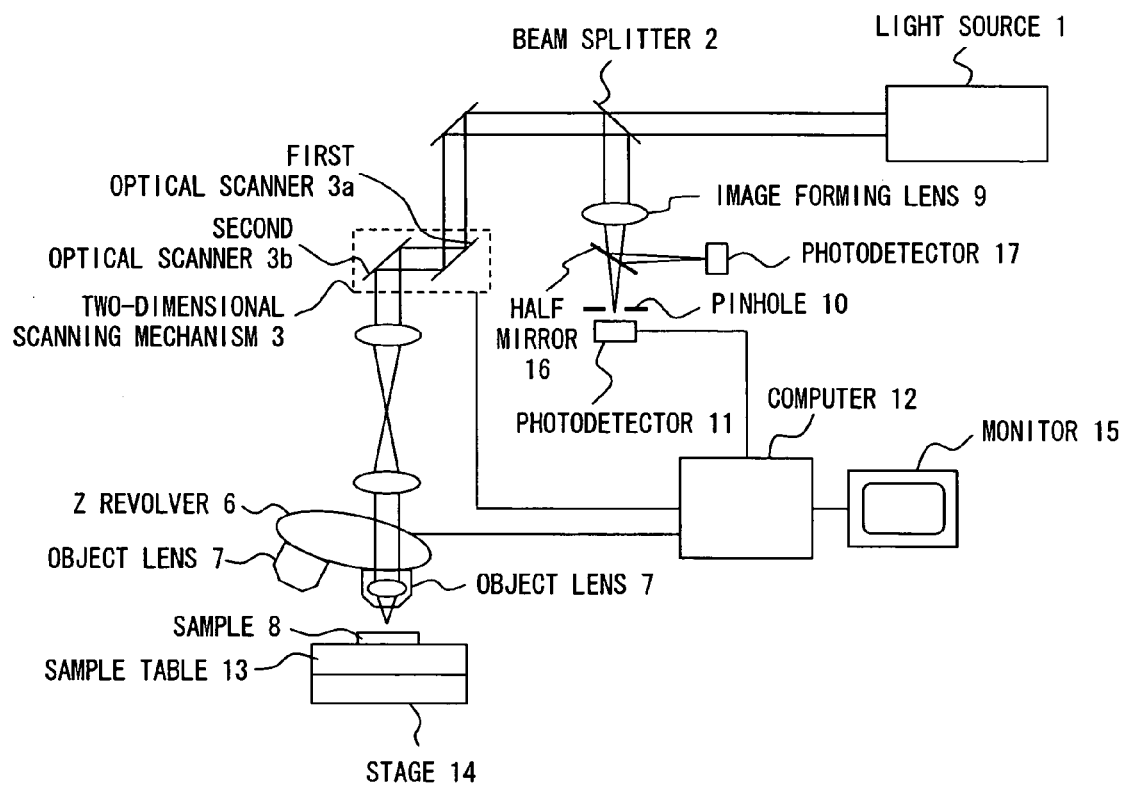
FIG. 18 shows the configuration of the scanning confocal microscope to which the fifth embodiment of the present invention is applied.

FIG. 18 shows the configuration of the scanning confocal microscope to which the fifth embodiment of the present invention is applied.

The scanning confocal microscope to which the fifth embodiment of the present invention is applied compares further comprises a half mirror 16 and an photodetector 17 as compared with the scanning confocal microscope to which the first embodiment of the present invention is applied.

That is, the light reflected by the surface of the sample 8 is introduced from the object lens 7 again to the beam splitter 2 through the two-dimensional scanning mechanism 3, converges by the image forming lens 9, and is divided by the half mirror 16 and detected by the photodetector 17 and the photodetector 11 through the pinhole 10. The image detected by the photodetector 17 is a non-confocal image and has a large depth of focus.

The scanning confocal microscope to which the fifth embodiment of the present invention is applied simultaneously displays a non-confocal image together with the three-dimensional image.

Then, the sample information measuring method using the scanning confocal microscope shown in FIG. 18 is explained below. The method of obtaining a height map image and repeatedly displaying a three-dimensional image is the same as those according to the above-mentioned embodiments.

FIGS. 19 through 22 show an example of displaying the 3D image 31 and the non-confocal image 32 on the monitor 15. The three-dimensional image 31 and the non-confocal image 32 of the surface of the sample 8 are simultaneously and continuously displayed on the monitor 15.

At this time, the display of the 3D image 31 is updated each time the height information is extracted, and the display of the non-confocal image 32 is updated for each position Z. That is, when the operation as shown in FIG. 4 is performed, the display of the 3D image 31 is updated each time a travel from Z (−2) to Z (2) is detected, and the display of the non-confocal image 32 is updated at each position of Z (−2), Z (−1), Z (0), Z(1), and Z(2).

Figure 19:
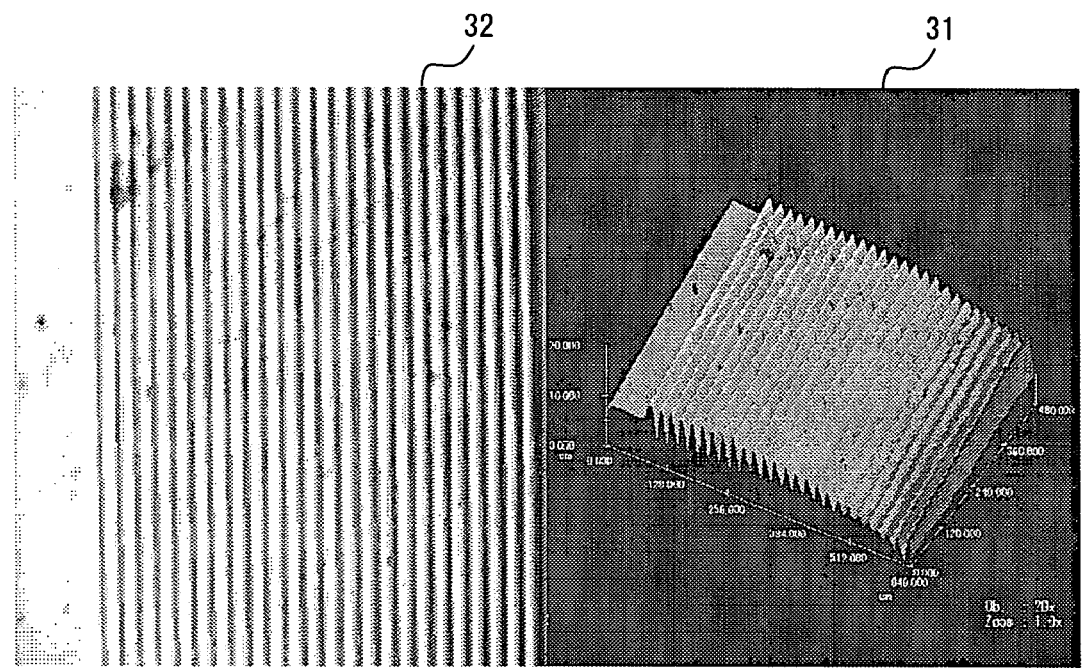
FIG. 19 shows an example (1) of a 3D image 31 and a non-confocal image 32 displayed on the monitor 15.
Figure 20:
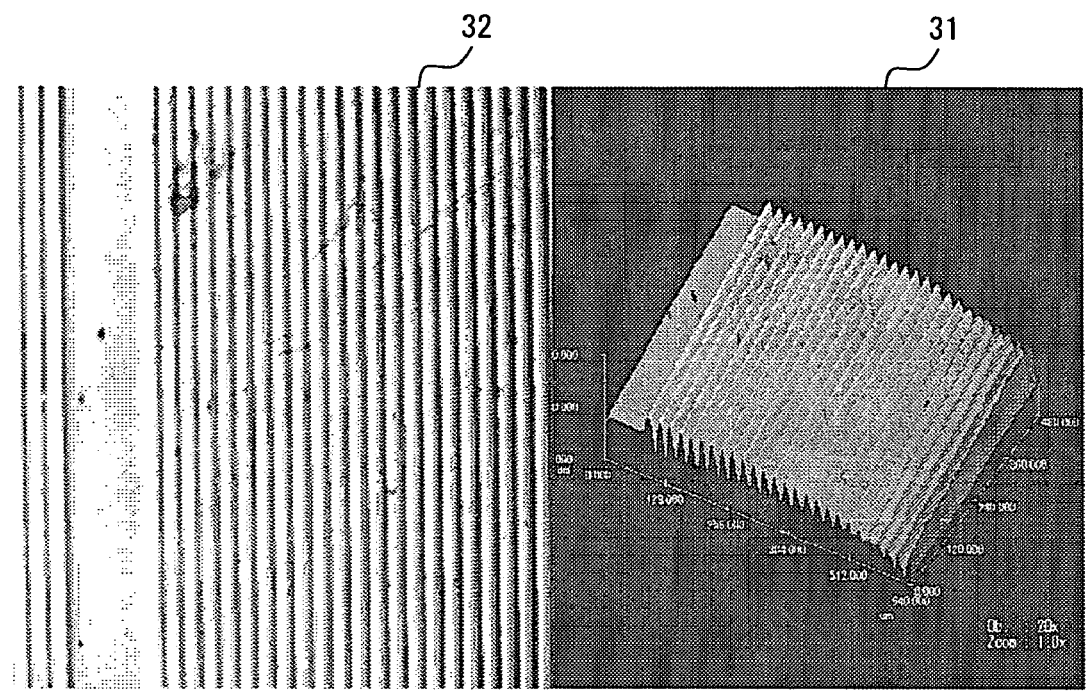
FIG. 20 shows an example (2) of a 3D image 31 and a non-confocal image 32 displayed on the monitor 15.
Figure 22:
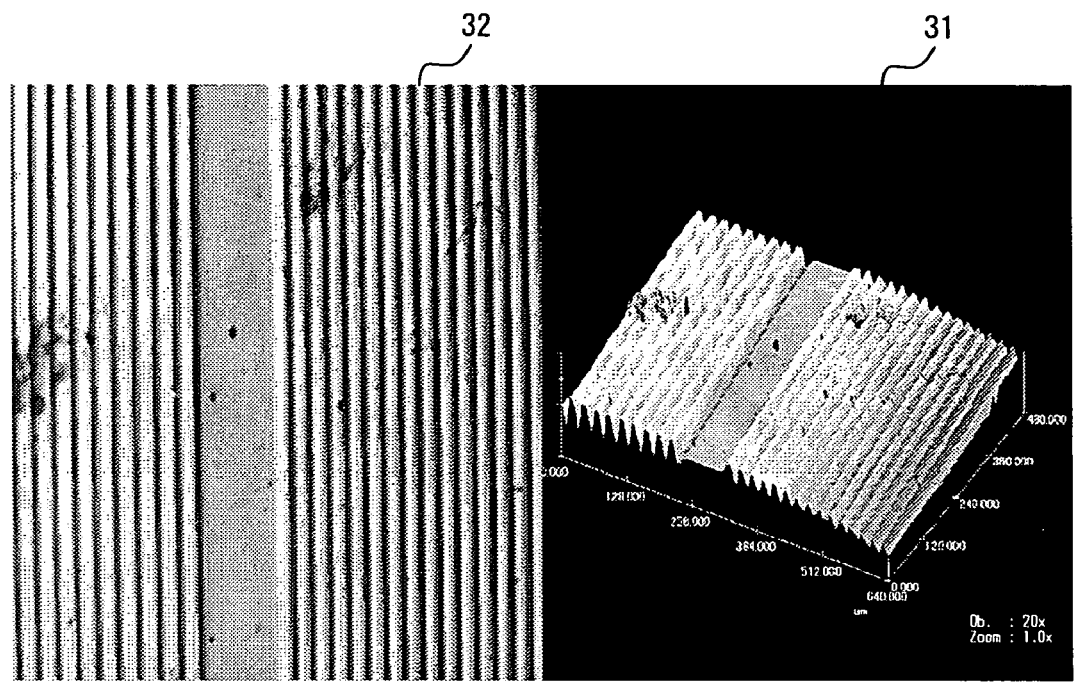
FIG. 22 shows an example (4) of a 3D image 31 and a non-confocal image 32 displayed on the monitor 15.

FIG. 19 shows an example of displaying the 3D image 31 and the non-confocal image 32 at Z (−1) on the monitor 15. FIG. 20 shows an example of displaying the 3D image 31 and the non-confocal image 32 at Z(0) on the monitor 15. FIG. 21 shows an example of displaying the 3D image 31 and the non-confocal image 32 at Z(1) on the monitor 15. FIG. 22 shows an example of displaying the 3D image 31 and the non-confocal image 32 at Z(2) on the monitor 15.

As shown in these FIGS. 19 through 22, the display of the 3D image 31 is updated each time the height information is extracted. Therefore, the same image is displayed from FIG. 19 to FIG. 21, and the image is first updated in FIG. 22. However, since the display of the non-confocal image 32 is updated for each position Z, the image is updated in each of FIGS. 19 through 22. As in the fourth embodiment of the present invention, the non-confocal image 32 displayed in this case can be in the reduced image displaying method.

Thus, by simultaneously and continuously updating and displaying the non-confocal image 32 obtained at each position Z in the Z scanning range on the screen of the same monitor 15 as the 3D image 31, losing the observation place of the sample 8 by the user when the sample 8 is moved in the XY directions can be avoided. Especially since the non-confocal image 32 has a large depth of focus, the information about the surface of the sample 8 can be easily obtained at any position Z, and the user can easily adjust the position of the sample 8 while simultaneously seeing the non-confocal image 32 and the 3D image 31. The more preferable operability can be obtained by the optical scanners 3a and 3b continuously during the scanning in the range Z, and updating the non-confocal image 32 for each frame.

Furthermore, the image displayed as a two-dimensional image can be a confocal image at each position Z instead of the non-confocal image 32. In this case, the depth of focus becomes smaller, but the change transition of the portions for which a focus can be obtained can be observed simultaneously with the three-dimensional shape.

Figure 23:
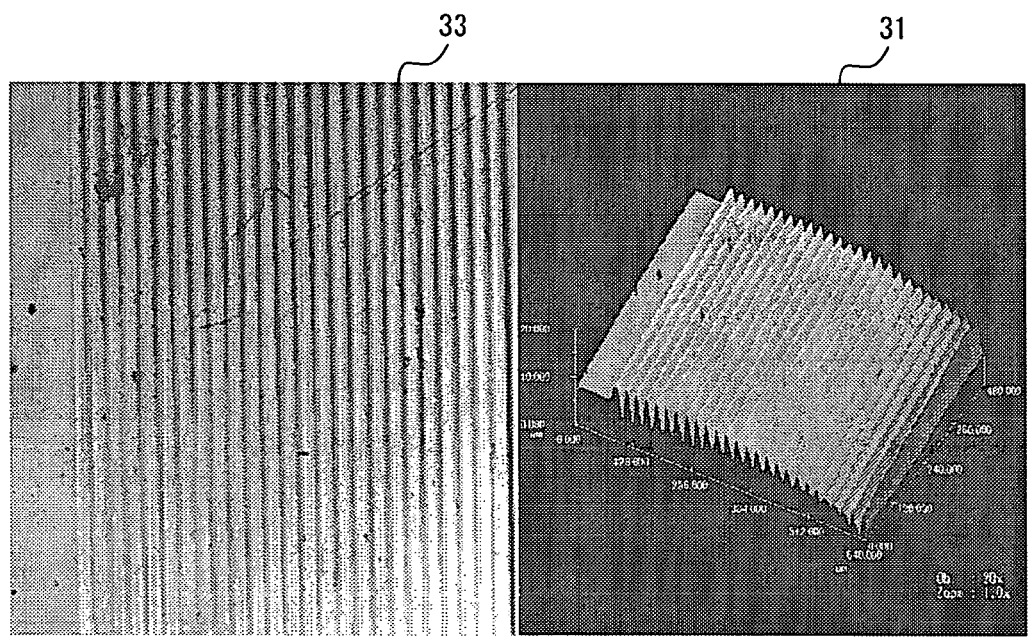
FIG. 23 shows an example (1) of a 3D image 31 and a non-confocal image 33 displayed on the monitor 15.
Figure 24:
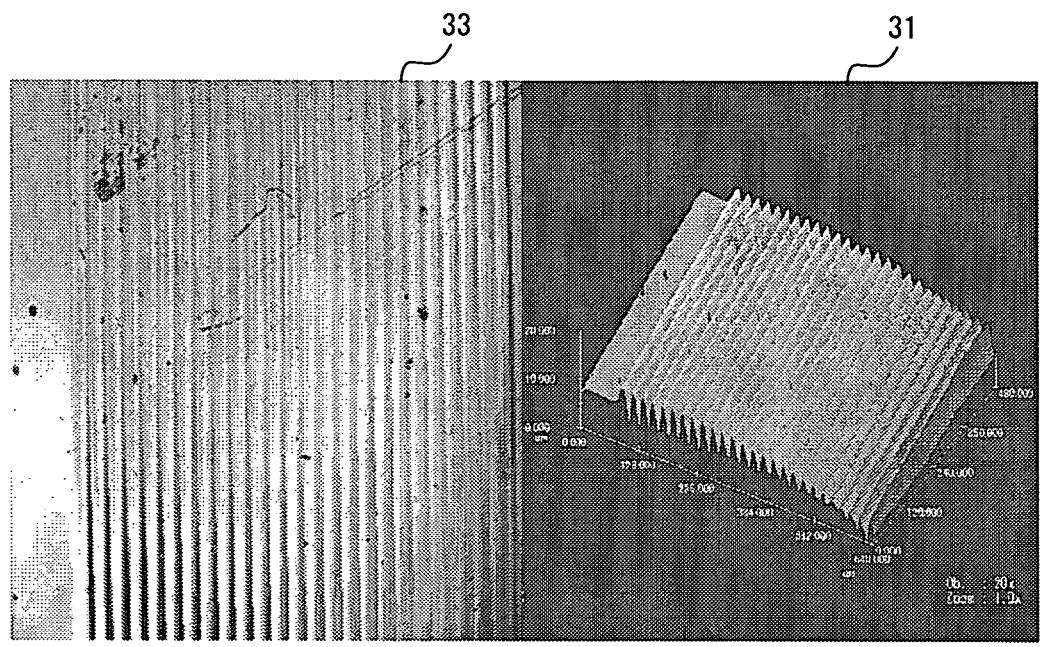
FIG. 24 shows an example (2) of a 3D image 31 and a non-confocal image 33 displayed on the monitor 15.

FIGS. 23 through 25 show an example of the 3D image 31 and the non-confocal image 33 displayed on the monitor 15. That is, the 3D image 31 indicating the three-dimensional shape and the non-confocal image 33 of the surface of the sample 8 are simultaneously updated and displayed on the monitor 15.

FIG. 23 shows an example of displaying the 3D image 31 and the non-confocal image 33 on the monitor 15 at Z (−1). FIG. 24 shows an example of displaying the 3D image 31 and the non-confocal image 33 on the monitor 15 at Z (0). FIG. 25 shows an example of displaying the 3D image 31 and the non-confocal image 33 on the monitor 15 at Z (1).

Described below is the sixth embodiment of the present invention.

Figure 26:
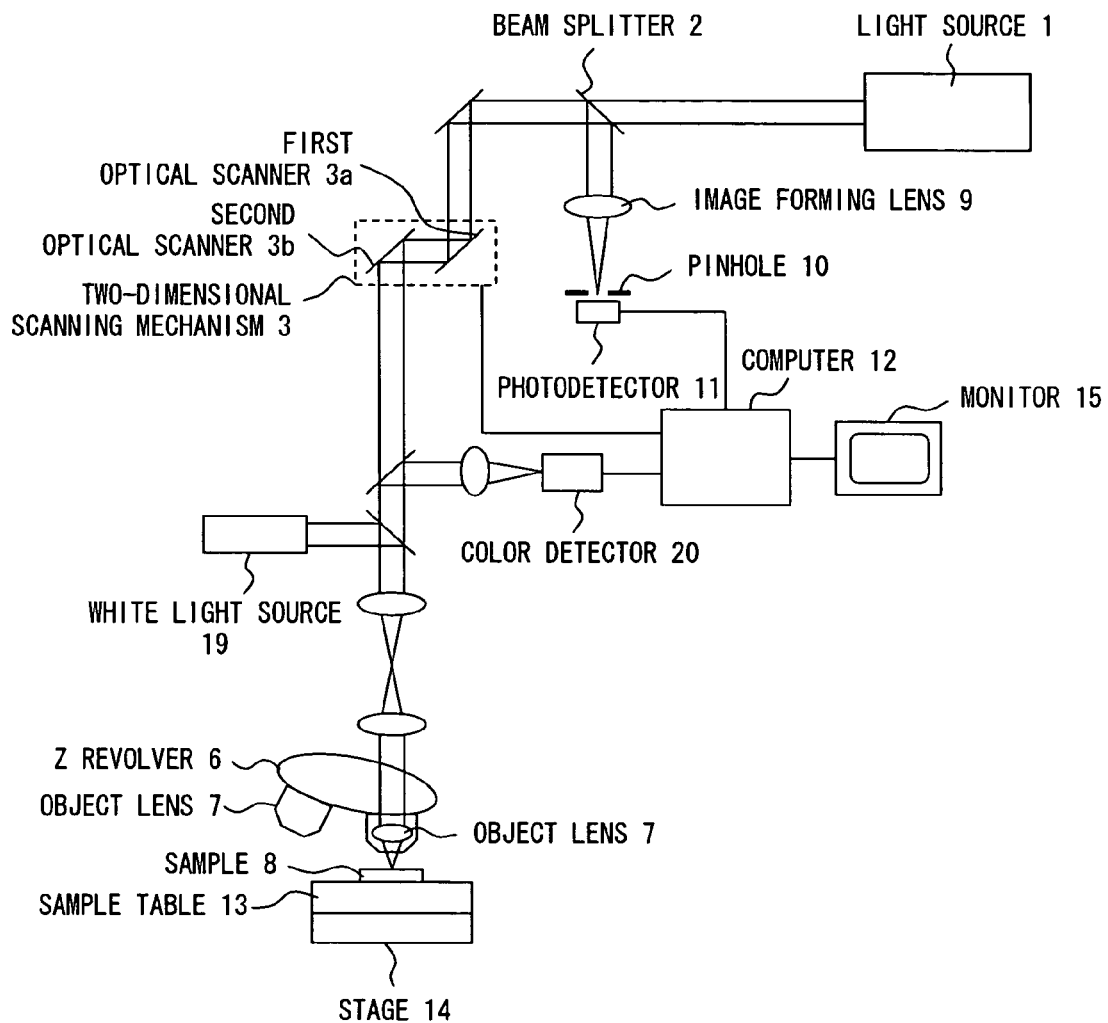
FIG. 26 shows the configuration of the scanning confocal microscope to which the sixth embodiment of the present invention is applied.

FIG. 26 shows the configuration of the scanning confocal microscope to which the sixth embodiment of the present invention is applied.

The scanning confocal microscope to which the sixth embodiment of the present invention further comprises the white light source 19 and a color detector 20 as compared with the scanning confocal microscope to which the first embodiment shown in FIG. 2A is applied.

That is, the light reflected by the surface of the sample 8 forms an image on the color detector 20 such as a color CCD, etc., a signal captured by the color detector 20 is fetched by a color image fetch board, and the color image is displayed on the monitor 15 together with the three-dimensional image.

The sample information measuring method using the scanning confocal microscope shown in FIG. 26 is explained below. The method for obtaining a height map image and repeatedly displaying a three-dimensional image is the same as those according to the above-mentioned embodiments.

FIG. 27 shows an example of displaying the 3D image 41 and the color image 42 on the monitor 15. The three-dimensional image 41 and the color image 42 of the surface of the sample 8 are simultaneously and continuously updated and displayed on the monitor 15.

At this time, the display of the 3D image 41 is updated each time the height information is extracted, and the Z moving operation, the scanner scanning, and the capturing and drawing the color image 42 can be asynchronously performed. Therefore, the color image 42 can be updated substantially at the frame rate.

As described above, by continuously updating and displaying the color image 42 obtained from the color detector 20 together with the 3D image 41 on the screen of the same monitor 15, losing the observation place of the sample 8 by the user when the sample 8 is moved in the XY directions can be avoided. Furthermore, since the information about the color can be obtained by the color image 42, the user can easily recognize the status of the surface of the sample 8, and can easily adjust the position of the sample 8 while simultaneously watching the color image 42 and the 3D image 41.

Instead of the display and update of the color image 42 at the frame rate, the color extend image whose focus has been composed such that the focus can be obtain on the entire image according to the information about the contrast, etc. from the information about the color image 42 can be displayed and updated each time the Z scanning is performed. In this case, a color extend image can be attached to the surface of the 3D image 41 in place of the extend image configured by the confocal image.

Explained below is the flow of the sample information measuring method common among the above-mentioned embodiments.

Figure 28:
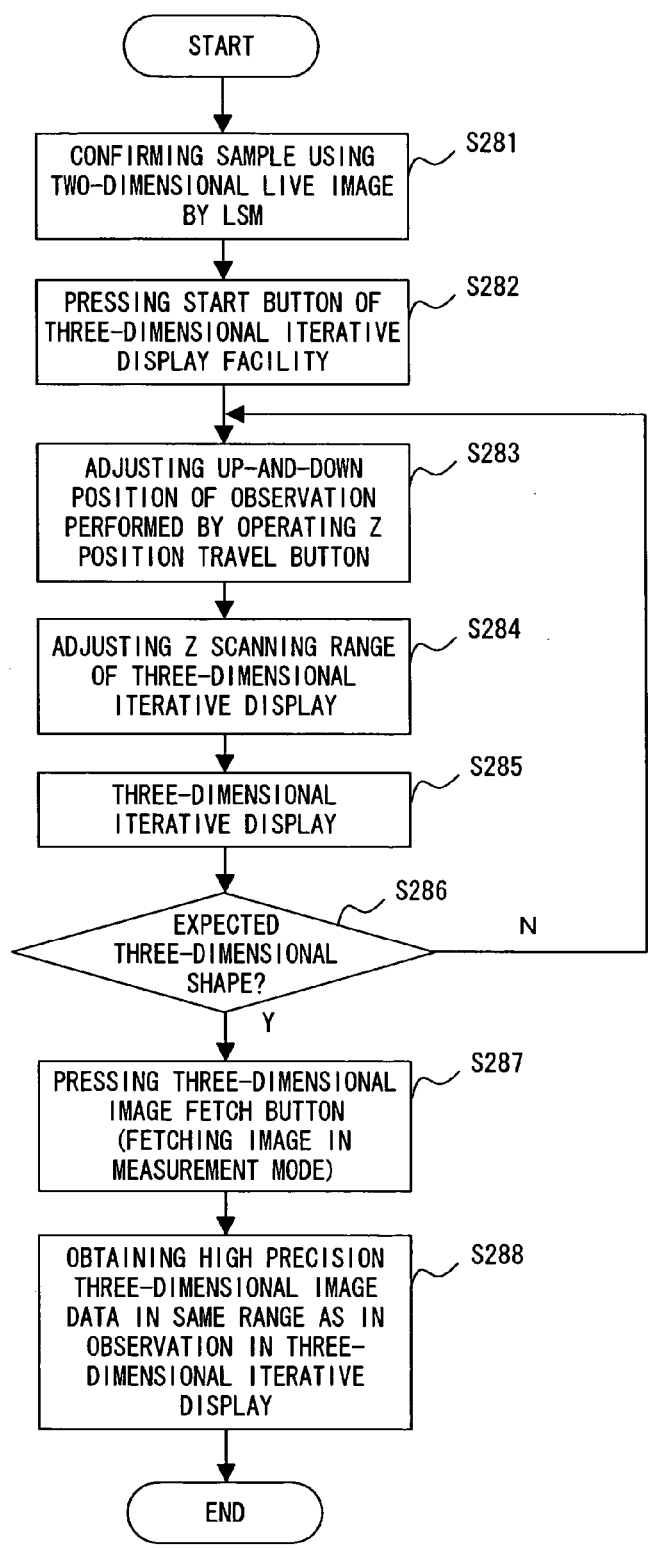
FIG. 28 is a flowchart shoring the flow of the sample information measuring process.

FIG. 28 is a flowchart of the flow of the sample information measuring method.

First, in step S281, the user confirms the sample 8 using a two-dimensional image by the scanning confocal microscope (LSM). In step S282, a start button is pressed to perform repeated display in the three-dimensional array.

In step S283, the Z position start button is operated and the observation position of the sample 8 to be observed in the Z direction. In step S284, the Z scanning range (width from the upper end position to the lower end position) of the three-dimensional repeated display is adjusted.

Then, the scanning confocal microscope according to each embodiment displays the 3D images 21, 31, and 41 by repeatedly scanning the sample 8 in the Z direction.

At this time, for example, as shown in FIG. 29, when the 3D image update indicator lamps 23 and 24 indicating the iterative display timing of the 3D image 21 are displayed on the monitor 15, the user can be informed of the timing of the update of the 3D image 21. The display example shown in FIG. 29 shows an example of the alternate display of the 3D image update indicator lamps 23 and 24 for each cycle at which the 3D image 21 is displayed. That is, at the first cycle, the 3D image update indicator lamp 23 is turned on while the 3D image update indicator lamp 24 is turned off. At the second cycle, the 3D image update indicator lamp 23 is turned off while the 3D image update indicator lamp 24 is turned on. At the third cycle, the 3D image update indicator lamp 23 is turned on again and the 3D image update indicator lamp 24 is turned off.

As described above, at each cycle of the display of the 3D image 21, the 3D image update indicator lamps 23 and 24 are displayed, thereby the user can be informed of the update timing of the 3D image 21 and the change timing of the measurement parameter. The 3D image update display indicating the timing of the iterative scanning display is not limited to the above-mentioned application, but one indicator lamp can be used, or various graphic or bar type level meters, etc. can be used.

It returns to the explanation of FIG. 28.

In step S285 shown in FIG. 28, the user determines whether or not the displayed 3D images 21, 31, and 41 have expected three-dimensional shapes. If the user determines that they do not have expected three-dimensional shapes (NO in step S286), then the processes in and after step S283 are repeated, thereby re-adjusting the observation position of the sample 8 to be observed in the Z direction (step S283) and also re-adjusting the Z scanning range of the three-dimensional iterative display (step S284).

When it is determined in step S286 that the image has an expected three-dimensional shape (YES in step S286), the three-dimensional image fetch button for fetching the image information in the measurement mode is pressed in step S287, thereby stopping the three-dimensional iterative display. In step S288, the high-precision three-dimensional image automatically converted to an equal or smaller size as compared with the Z scanning step or the XY scanning step used when observation is made with the three-dimensional iterative display in the same scanning range as in the observation with the three-dimensional iterative display in step S285 is obtained. Therefore, the measurement higher in precision than the measurement of the image continuously updated and displayed can be performed.

Thus, each embodiment according to the present invention is described above, but the configuration of the scanning confocal microscope according to the present invention is not limited to the configuration shown in FIG. 2A, 18, or 26, and can be applied to various types of scanning confocal microscopes.

For example, a configuration of rotating a Nipkow disk at a high speed with a plurality of fine apertures designed in a spiral pattern on a disk can be used. At this time, the Nipkow disk also functions as the fine apertures arranged in the positions conjugate with the beam condensing position of the object lens, and a two-dimensional image sensor such as a CCD, etc. is used as an optical detector. Furthermore, a two-dimensional optical scanning mechanism is replaced with a one-dimensional optical scanner in scanning one line of a sample using a converging beam of an object lens and measuring the sectional shape of the sample.

As a moving mechanism for relatively moving the beam condensing position of the object lens 7 with the position of the sample 8, the Z revolver 6 for moving the object lens 7 can be replaced with a stage mechanism for moving the position of the sample 8.

An applicable configuration is not limited to those described above, but various types of scanning confocal microscopes can be used. That is, the scanning confocal microscope and the sample information measuring method according to the present invention can be designed in various configurations or shapes without limitations in the range of the gist of the present invention.

What is claimed is:

1. A sample information measuring method, comprising:
   irradiating a sample with light from a light source through an object lens;
   discretely changing a relative position between a beam condensing position of the object lens and the sample in an optical axis direction of the converging beam;
   obtaining light intensity information from the sample at each relative position;
   extracting plural pieces of light intensity information from a light intensity information group;
   estimating a maximum value on a change curve adaptive to the plural pieces of extracted light intensity information and the relative position for the maximum value; and
   obtaining the estimated maximum value of the light intensity information and relative position as brightness information and height information, wherein
   the brightness information and height information about the sample can be continuously obtained by discretely performing an iterative operation on the relative position between a beam condensing position of the object lens and the sample in an optical axis direction of the converging beam, and processing light intensity information from the sample at each relative position obtained in a time between an inverse operation of the moving mechanism and a next inverse operation during the iterative operation.

2. The method according to claim 1, wherein
   three-dimensional image is obtained with high-precision with equal or smaller travel interval (step) of discretely changing the converging beam in an optical axis direction when an instruction is issued to fetch an image for a measurement mode in which the sample is measured with high precision when the brightness information and height information about the sample are continuously obtained by discretely performing an iterative operation on the relative position between a beam condensing position of the object lens and the sample in an optical axis direction of the converging beam, as compared with a time when the brightness information and height information about the sample is continuously obtained by the iterative operation.

3. The method according to claim 1, wherein
   three-dimensional image is obtained with high precision with equal or smaller two-dimensional scanning interval (step) of scanning a beam condensing position of an object lens relative to the sample in a direction perpendicular to an optical axis of the converging beam when an instruction is issued to fetch an image for a measurement mode in which the sample is measured with high precision when the brightness information and height information about the sample are continuously obtained by discretely performing an iterative operation on the relative position between a beam condensing position of the object lens and the sample in an optical axis direction of the converging beam, as compared with a time when the brightness information and height information about the sample is continuously obtained by the iterative operation.

4. The method according to claim 1, wherein
   a shape of the sample is continuously updated and displayed according to the brightness information and height information about the continuously obtained sample by the iterative operation.

5. The method according to claim 4, wherein
   a measurement position is specified on a sample shape continuously updated and displayed by the iterative operation, and the sample shape is measured based on the specified measurement position.

6. A scanning confocal microscope, comprising:
   an object lens converging light from a light source in a sample;
   a moving mechanism relatively moving a beam condensing position of the object lens with a position of the sample in an optical axis direction of the converging beam;
   a confocal diaphragm arranged in a position conjugate with a beam condensing position of the object lens; and
   an photodetector detecting intensity of light passing through the confocal diaphragm;
   a unit discretely performing an iterative operation on a relative position between a beam condensing position of the object lens to the sample in an optical axis direction of the converging beam by the moving mechanism;
   a unit obtaining light intensity information from the sample at each relative position;
   a unit extracting plural pieces of light intensity information from a light intensity information group;
   a unit estimating a maximum value on a change curve adaptive to the plural pieces of extracted light intensity information, and the relative position for the maximum value; and
   a brightness and height information arithmetic unit obtaining the estimated maximum value of light intensity information and relative position as brightness information and height information, wherein
   the brightness and height information arithmetic unit processes light intensity information from the sample at each relative position obtained in a time between an inverse operation of the moving mechanism and a next inverse operation, and continuously obtains the brightness information and height information in synchronization with an iterative operation of the moving mechanism.

7. The microscope according to claim 6, further comprising
a three-dimensional image data acquisition instruction unit fetching an image for a measurement mode in which the sample is measured with high precision, wherein
the brightness and height information arithmetic unit obtains three-dimensional image data with a high precision at equal or shorter travel intervals (steps) of discretely changing the converging beam in an optical axis direction when the three-dimensional image data acquisition instruction unit is specified when the brightness information and height information about the sample are continuously obtained by discretely performing an iterative operation on the relative position between a beam condensing position of the object lens and the sample in an optical axis direction of the converging beam, as compared with a time when the brightness information and height information about the sample are continuously obtained by the iterative operation.

8. The microscope according to claim 6, further comprising:
a two-dimensional scanning unit scanning in a direction perpendicular to an optical axis of the converging beam; and
a three-dimensional image data acquisition instruction unit fetching an image for a measurement mode in which the sample is measured with high precision, wherein
the brightness and height information arithmetic unit obtains three-dimensional image data with high precision at equal or shorter two-dimensional scanning intervals (steps) of performing scanning in a direction perpendicular to an optical axis of the converging beam when the three-dimensional image data acquisition instruction unit is specified when the brightness information and height information about the sample are continuously obtained by discretely performing an iterative operation on the relative position between a beam condensing position of the object lens and the sample in an optical axis direction of the converging beam, as compared with a time when the brightness information and height information about the sample are continuously obtained by the iterative operation.

9. The microscope according to claim 6, further comprising
a display unit continuously updating and simultaneously displaying a shape of the sample according to the brightness information and height information about the continuously obtained sample.

10. The microscope according to claim 9, further comprising:
a measurement position designation unit designating a measurement position on a sample shape continuously updated and displayed; and
a sample shape measurement unit measuring the sample shape based on the measurement position designated by the measurement position designation unit.

11. A sample information measuring method, comprising:
irradiating a sample with light from a light source through an object lens;
discretely changing a relative position between a beam condensing position of the object lens and the sample in an optical axis direction of the converging beam;
obtaining light intensity information from the sample at each relative position;
extracting plural pieces of light intensity information from a light intensity information group;
estimating a maximum value on a change curve adaptive to the plural pieces of extracted light intensity information and the relative position for the maximum value; and
obtaining the estimated maximum value of the light intensity information and relative position as brightness information and height information, wherein:
the brightness information and height information about the sample can be continuously obtained by discretely performing an iterative operation on the relative position between a beam condensing position of the object lens and the sample in an optical axis direction of the converging beam and processing light intensity information from the sample at each relative position obtained in a time between an inverse operation of the moving mechanism and a next inverse operation during the iterative operation; and
a 3D image of the sample shape generated according to the obtained height information and the brightness information are continuously updated and displayed on a same screen.

12. The method according to claim 11, wherein
a confocal image is generated according to the brightness information, and is continuously updated and displayed with the 3D image on a same screen by the iterative operation.

13. The method according to claim 12, wherein
the confocal image is an extend image.

14. The method according to claim 11, wherein
the 3D image is updated and displayed each time the shape is obtained; and
the brightness information displayed with the 3D image is updated and displayed each time the brightness information is obtained.

15. The method according to claim 11, wherein
a timing of updating an image is reported on a display screen for display of an image while continuously updating the image by the iterative operation.

16. A scanning confocal microscope, comprising:
an object lens converging light from a light source in a sample;
a moving mechanism relatively moving a beam condensing position of the object lens with a position of the sample in an optical axis direction of the converging beam;
a confocal diaphragm arranged in a position conjugate with a beam condensing position of the object lens; and
an photodetector detecting intensity of light passing through the confocal diaphragm;
a unit discretely performing an iterative operation on a relative position between a beam condensing position of the object lens to the sample in an optical axis direction of the converging beam by the moving mechanism;
a unit obtaining light intensity information from the sample at each relative position;
a unit extracting plural pieces of light intensity information from a light intensity information group;

a unit estimating a maximum value on a change curve adaptive to the plural pieces of extracted light intensity information, and the relative position for the maximum value;

a brightness and height information arithmetic unit obtaining the estimated maximum value of light intensity information and relative position as brightness information and height information, processing light intensity information from the sample at each relative position obtained in a time between an inverse operation of the moving mechanism and a next inverse operation, and continuously obtaining the brightness information and height information in synchronization with an iterative operation of the moving mechanism; and a display unit generating a 3D image of the sample shape according to the brightness information and height information about the continuously obtained sample, and continuously updating and simultaneously displaying the image with the brightness information on a same screen.

17. The microscope according to claim 16, wherein the display unit generates a confocal image according to the brightness information, and continuously updating and simultaneously displaying the image with the 3D image on a same screen by the iterative operation.

18. The microscope according to claim 17, wherein the confocal image is an extend image.

19. The microscope according to claim 16, wherein the display unit updates and simultaneously displays the 3D image each time the shape is obtained; and the brightness information is updated and simultaneously displayed each time the brightness information is obtained.

20. The microscope according to claim 16, wherein the display unit comprises an image update and display unit displaying an image at an update timing of the image.

21. The method according to claim 5, wherein a profile of the sample at a measurement position specified in a shape of the sample is displayed, and the shape of the sample is measured on the profile.

22. The microscope according to claim 10, wherein a profile of the sample at a measurement position in a shape of the sample designated by the measurement position designation unit is displayed, and the shape of the sample is measured on the profile.

23. A sample information measuring method, the method comprising:

irradiating a sample with light from a light source through an object lens;

discretely moving a relative position between a beam condensing position of the object lens and the sample in an optical axis direction of the converging beam within a desired Z scanning area;

obtaining light intensity information from the sample at each relative position;

extracting plural pieces of light intensity information from a light intensity information group;

estimating a maximum value on a change curve adaptive to the plural pieces of extracted light intensity information and the relative position for the maximum value; and obtaining the estimated maximum value of the light intensity information and relative position as brightness information and height information;

wherein the brightness information and height information about the sample can be continuously obtained by discretely performing an iterative operation on the relative position between a beam condensing position of the object lens and the sample from a lower limit position to an upper limit position and from an upper limit position to the lower limit position of the Z scanning area in an optical axis direction of the converging beam, and a shape of the sample is continuously updated and displayed according to the brightness information and height information about the continuously obtained sample by the iterative operation.

24. The method according to claim 23, wherein a three-dimensional image is obtained with high precision with equal or smaller travel interval (step) of discretely changing the converging beam in an optical axis direction when an instruction is issued to fetch an image for a measurement mode in which the sample is measured with high precision when the brightness information and height information about the sample are continuously obtained by discretely performing an iterative operation on the relative position between a beam condensing position of the object lens and the sample within the Z scanning area in an optical axis direction of the converging beam, as compared with a time when the brightness information and height information about the sample is continuously obtained by the iterative operation.

25. The method according to claim 23, wherein the Z scanning range can be changed during the iterative operation on the relative position between a beam condensing position of the object lens and the sample within the Z scanning area in an optical axis direction of the converging beam.

26. The method according to claim 23, wherein a measurement position is specified on a sample shape continuously updated and displayed by the iterative operation, and the sample shape is measured based on the specified measurement position.

27. The method according to claim 23, wherein a 3D image of the sample shape generated according to the obtained height information and a confocal image generated according to the brightness information are continuously updated and displayed with the 3D image on a same screen by the iterative operation on a same screen.

28. The method according to claim 27, wherein the confocal image is an extend image.

* * * * *